(12) United States Patent
Do et al.

(10) Patent No.: US 10,555,190 B2
(45) Date of Patent: Feb. 4, 2020

(54) RESOLVING HIDDEN AND EXPOSED NODE PROBLEMS USING COORDINATED SENSING

(71) Applicant: Telefonaktiebolaget LM Ericsson (publ), Stockholm (SE)

(72) Inventors: Tai Do, Lund (SE); Dzevdan Kapetanovic, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/761,848

(22) PCT Filed: Jan. 26, 2018

(86) PCT No.: PCT/EP2018/052003
§ 371 (c)(1),
(2) Date: Mar. 21, 2018

(87) PCT Pub. No.: WO2019/145045
PCT Pub. Date: Aug. 1, 2019

(65) Prior Publication Data
US 2019/0239094 A1    Aug. 1, 2019

(51) Int. Cl.
*H04W 16/14* (2009.01)
*H04W 24/02* (2009.01)
*H04B 17/318* (2015.01)

(52) U.S. Cl.
CPC ......... *H04W 24/02* (2013.01); *H04B 17/318* (2015.01); *H04W 16/14* (2013.01)

(58) Field of Classification Search
CPC .................................................. H04W 24/02
See application file for complete search history.

(56) References Cited

U.S. PATENT DOCUMENTS

2008/0260084 A1* 10/2008 Horiguchi ............. H04W 72/02
                                                                    375/359
2010/0248760 A1   9/2010 Li et al.
(Continued)

FOREIGN PATENT DOCUMENTS

WO    2015185989 A2    12/2015
WO    2016163811 A1    10/2016

OTHER PUBLICATIONS

Ng, Boon L. et al., "Unified access in licensed and unlicensed bands in LTE-A Pro and 5G", SIP (2017), vol. 6, Industrial Technology Advances, Jun. 5, 2017, 1-7.

*Primary Examiner* — Michael T Vu
(74) *Attorney, Agent, or Firm* — Murphy, Bilak & Homiller, PLLC

(57) ABSTRACT

Provided is a method of operating a wireless device in a wireless communication network. The method includes identifying, by a transmitter in the network node, data to transmit according to a data transmission scheme to a receiver in the wireless communication network, determining, by the transmitter in the wireless communication network, first wireless signal power information at the transmitter, receiving into the transmitter, second wireless signal power information at the receiver and comparing the first wireless signal power information to a first power threshold and/or the second wireless signal power information to a second power threshold. Based on comparing the first wireless signal power information to the first power threshold and/or the second wireless signal power information to the second power threshold, transmitting the identified data to the receiver or determining not to transmit the identified data to the receiver.

20 Claims, 16 Drawing Sheets

(56) References Cited

U.S. PATENT DOCUMENTS

| | | | |
|---|---|---|---|
| 2016/0066195 A1* | 3/2016 | Moon | H04W 16/14 |
| | | | 455/454 |
| 2016/0088657 A1 | 3/2016 | Djukic et al. | |
| 2017/0118774 A1 | 4/2017 | Cariou et al. | |
| 2017/0303314 A1* | 10/2017 | Cariou | H04W 74/0808 |
| 2018/0352520 A1* | 12/2018 | Zhang | H04W 52/40 |

* cited by examiner

RESOLVING HIDDEN AND EXPOSED NODE PROBLEMS USING COORDINATED SENSING

TECHNICAL FIELD

The disclosed subject matter relates generally to telecommunications. Certain embodiments relate more particularly to efficient use of unlicensed and licensed spectrums in a network.

BACKGROUND

Allowing unlicensed networks, i.e., networks that operate in unlicensed spectrum to effectively use the available spectrum may be an attractive approach to increase system capacity. While unlicensed spectrum can never match the qualities of the licensed regime, solutions that allow an efficient use of the unlicensed spectrum as a complement to licensed deployments may have the potential to bring great value to the 3GPP operators, and, ultimately, to the 3GPP industry as a whole. Such solutions may enable operators and vendors to leverage the existing or planned investments in LTE/NR hardware in the radio and core network.

Licensed-Assisted Access (LAA), which is an initiative for LTE to operate and support download (DL) traffic on unlicensed spectrum, was first introduced in LTE Rel-13. Enhanced LAA (eLAA) and Further enhanced LAA (fe-LAA) have been proposed to support both upload (UL) and DL traffic in unlicensed spectra in later releases. The LAA framework builds on the carrier aggregation solutions to access the additional bandwidth in the unlicensed band. Brief reference is now made to FIG. 5, which is a schematic diagram illustrating primary and secondary carriers operating in a further enhanced license assisted access network. As illustrated in FIG. 5, the primary cell (PCell) may retain the exchange of essential control messages and may also provide always-available robust spectrum for real-time or high-value traffic. The PCell also provides mobility handling and management for the user equipment (UE) via the high-quality licensed band radio access network with wide coverage. The aggregated secondary cells (SCells) in the unlicensed band, when available, can be utilized as bandwidth booster to serve, e.g., best effort traffic. The LAA SCell may operate in DL-only mode or operate with both UL and DL traffic.

Approaches described in the Background section could be pursued, but are not necessarily approaches that have been previously conceived or pursued. Therefore, unless otherwise indicated herein, the approaches described in the Background section are not prior art to the inventive embodiments disclosed in this application and are not admitted to be prior art by inclusion in the Background section. Therefore, any description contained in the Background section may be moved to the Detailed Description section.

SUMMARY

Example methods, nodes, and systems are operable to perform methods of operating a wireless device in a wireless communication network. Such methods may include methods of operating a wireless device in a wireless communication network (100). Methods may include, in response to a transmitter of the wireless device identifying data to transmit according to a data transmission scheme to a receiver in the wireless communication network, determining, by the transmitter in the wireless communication network, first wireless signal power information at the transmitter. Some embodiments include receiving into the transmitter, second wireless signal power information at the receiver, comparing the first wireless signal power information to a first power threshold and/or the second wireless signal power information to a second power threshold, and based on the comparing, transmitting the data to the receiver or determining not to transmit the data to the receiver.

In some embodiments, before determining the first wireless signal power information at the transmitter, methods may determine whether the data transmission scheme corresponds to a narrow transmission in a beam direction or wide beam in an omni direction. Some embodiments provide that, responsive to the data transmission scheme corresponding to the narrow transmission in the beam direction, determining the first wireless signal power information at the transmitter comprises determining the first wireless signal power information in the beam direction at the transmitter and that, responsive to the data transmission scheme corresponding to the wide transmission in the omni direction, determining the first wireless signal power information at the transmitter comprises determining the first wireless signal power information in the omni direction at the transmitter.

In some embodiments, responsive to the data transmission scheme corresponding to the narrow transmission, the second wireless signal power information at the receiver is determined in a direction that corresponds to the beam direction. Some embodiments provide that, responsive to the data transmission scheme corresponding to the wide transmission in the omni direction, the second wireless signal power information at the receiver is determined in the omni direction relative to the receiver.

In some embodiments, receiving, into the transmitter, the second wireless signal power information at the receiver comprises receiving the second wireless signal power information as periodic data that is received from the receiver at regular time intervals.

Some embodiments provide that receiving, into the transmitter, the second wireless signal power information at the receiver comprises receiving the second wireless signal power information as aperiodic data that is received other than at regular time intervals.

In some embodiments, receiving the second wireless signal power information as aperiodic data that is received other than at regular time intervals comprises receiving the second wireless signal power information at scheduled transmission times.

Some embodiments include sending a sensing request from the transmitter to the receiver to request that the receiver determine the second wireless signal power information and send the second wireless signal power information to the transmitter in response to the sensing request and receiving the second wireless signal power information from the receiver.

In some embodiments, comparing the first wireless signal power information to the first power threshold and/or the second wireless signal power information to the second power threshold comprises comparing the first wireless signal power information to the first power threshold, and transmitting the data to the receiver or determining not to transmit the data to the receiver comprises determining not to transmit the data responsive to the first wireless signal power information including a power value that is not less than the first power threshold.

In some embodiments, responsive to the first wireless signal power information including a power value that is less than the first power threshold, the method includes sending a sensing request from the transmitter to the receiver to request that the receiver determine the second wireless signal power information and receiving the second wireless signal power information from the receiver. Some embodiments provide that, responsive to the first wireless signal power information including a power value that is not less than the first power threshold, the method includes determining not to send a sensing request from the transmitter to the receiver.

Some embodiments provide that comparing the first wireless signal power information to the first power threshold and/or the second wireless signal power information to the second power threshold comprises comparing the second wireless signal power information to the second power threshold and that transmitting the data to the receiver or determining not to transmit the data to the receiver comprises determining not to transmit the data responsive to the second wireless signal power information including a power value that is not less than the second power threshold. In some embodiments, responsive to the second wireless signal power information including a power value that is less than the second power threshold, the data is transmitted to the receiver.

In some embodiments, receiving the second wireless signal power information is performed over a licensed channel and/or an unlicensed channel.

Some embodiments include sending a sensing request from the transmitter, over a licensed channel and/or an unlicensed channel, to the receiver to request that the receiver determine the second wireless signal power information.

Some embodiments disclosed herein include methods of operating a network node in a wireless communication network. Such methods may include identifying, by a transmitter in the network node, data to transmit according to a data transmission scheme to a receiver in the wireless communication network, determining, by the transmitter in the wireless communication network, first wireless signal power information at the transmitter, receiving into the transmitter, second wireless signal power information at the receiver, comparing the first wireless signal power information to a first power threshold and/or the second wireless signal power information to a second power threshold, and based on comparing the first wireless signal power information to the first power threshold and/or the second wireless signal power information to the second power threshold, transmitting the identified data to the receiver or determining not to transmit the identified data to the receiver.

Some embodiments include, before determining the first wireless signal power information at the transmitter, determining whether the identified data corresponds to a narrow transmission in a beam direction or wide beam in an omni direction. In some embodiments, responsive to the data transmission scheme corresponding to the narrow transmission, the second wireless signal power information at the receiver is determined in a direction that corresponds to the beam direction. Some embodiments provide that, responsive to the data transmission scheme corresponding to the wide transmission in the omni direction, the second wireless signal power information at the receiver is determined in the omni direction relative to the receiver.

In some embodiments, responsive to the identified data corresponding to the narrow transmission in the beam direction, the first wireless signal power information is determined at the transmitter in the beam direction at the transmitter and, responsive to the identified data corresponding to the wide transmission in the omni direction, the first wireless signal power information is determined at the transmitter in the omni direction at the transmitter.

In some embodiments, receiving the second wireless signal power information at the receiver comprises receiving the second wireless signal power information as periodic data that is received from the receiver at regular time intervals.

Some embodiments provide that receiving the second wireless signal power information at the receiver comprises receiving the second wireless signal power information as aperiodic data that is received other than at regular time intervals. In some embodiments, the aperiodic data is received at scheduled transmission times. Some embodiments include sending a sensing request from the transmitter to the receiver to request that the receiver determine the second wireless signal power information and send the second wireless signal power information to the transmitter in response to the sensing request and receiving the second wireless signal power information from the receiver.

Some embodiments provide that comparing the first wireless signal power information to the first power threshold and/or the second wireless signal power information to the second power threshold comprises comparing the first wireless signal power information to the first power threshold and that transmitting the identified data to the receiver or determining not to transmit the data to the receiver comprises determining not to transmit the identified data responsive to the first wireless signal power information including a power value that is not less than the first power threshold.

In some embodiments, responsive to the first wireless signal power information including a power value that is less than the first power threshold, the method includes sending a sensing request from the transmitter to the receiver to request that the receiver determine the second wireless signal power information and receiving the second wireless signal power information from the receiver. Some embodiments provide that comparing the first wireless signal power information to the first power threshold and/or the second wireless signal power information to the second power threshold comprises comparing the second wireless signal power information to the second power threshold and that transmitting the identified data to the receiver or determining not to transmit the identified data to the receiver comprises determining not to transmit the data responsive to the second wireless signal power information including a power value that is not less than the second power threshold.

In some embodiments, responsive to the second wireless signal power information including a power value that is less than the second power threshold, transmitting the identified data to the receiver.

Some embodiments provide that receiving the second wireless signal power information is performed over a licensed channel and/or an unlicensed channel.

Some embodiments disclosed herein are directed to a computer program product comprising a non-transitory computer readable medium storing program code that when executed by a processor of a wireless device causes the wireless device to perform operations disclosed herein.

Some embodiments disclosed herein are directed to a user equipment (UE) adapted to perform operations disclosed herein.

Some embodiments disclosed herein are directed to a radio communication network that includes a radio node. The radio node may include a transceiver to provide wireless communication over a radio interface, at least one processor coupled to the transceiver, and at least one memory coupled to the at least one processor and storing program code that when executed by the at least one processor causes the at least one processor to perform operations comprising identifying data to transmit according to a data transmission scheme to a receiver in the radio communication network, determining a first wireless signal power information at the transceiver, receiving, from the receiver, second wireless signal power information at the receiver, comparing the first wireless signal power information to a first power threshold and/or the second wireless signal power information to a second power threshold, and based on comparing the first wireless signal power information to the first power threshold and/or the second wireless signal power information to the second power threshold, transmitting the identified data to the receiver or determining not to transmit the identified data to the receiver.

Some embodiments disclosed herein are directed to a network node in a wireless communication network and that includes a transceiver to provide wireless communication over a radio interface, at least one processor coupled to the transceiver, and at least one memory coupled to the at least one processor and storing program code that when executed by the at least one processor causes the at least one processor to perform operations comprising identifying data to transmit according to a data transmission scheme to a receiver in the radio communication network, determining a first wireless signal power information at the transceiver, receiving, from the receiver, second wireless signal power information at the receiver, comparing the first wireless signal power information to a first power threshold and/or the second wireless signal power information to a second power threshold, and based on comparing the first wireless signal power information to the first power threshold and/or the second wireless signal power information to the second power threshold, transmitting the identified data to the receiver or determining not to transmit the identified data to the receiver.

Some embodiments include, before determining the first wireless signal power information at the transceiver, determining whether the data transmission scheme corresponds to a narrow transmission in a beam direction or wide beam in an omni direction.

In some embodiments, responsive to the data transmission scheme corresponding to the narrow transmission in the beam direction, determining the first wireless signal power information at the transceiver comprises determining the first wireless signal power information in the beam direction at the transceiver and, responsive to the data transmission scheme corresponding to the wide transmission in the omni direction, determining the first wireless signal power information at the transceiver comprises determining the first wireless signal power information in the omni direction at the transceiver.

In some embodiments, responsive to the data transmission scheme corresponding to the narrow transmission, the second wireless signal power information at the receiver is determined in a direction that corresponds to the beam direction.

Some embodiments provide that, responsive to the data transmission scheme corresponding to the wide transmission in the omni direction, the second wireless signal power information at the receiver is determined in the omni direction relative to the receiver.

In some embodiments, receiving the second wireless signal power information at the receiver comprises receiving the second wireless signal power information as periodic data that is received from the receiver at regular time intervals.

Some embodiments provide that receiving the second wireless signal power information at the receiver comprises receiving the second wireless signal power information as aperiodic data that is received other than at regular time intervals.

In some embodiments, receiving the second wireless signal power information as aperiodic data that is received other than at regular time intervals comprises receiving the second wireless signal power information at scheduled transmission times.

Some embodiments include sending a sensing request from the transceiver to the receiver to request that the receiver determine the second wireless signal power information and send the second wireless signal power information to the transceiver in response to the sensing request and receiving the second wireless signal power information from the receiver.

In some embodiments, comparing the first wireless signal power information to the first power threshold and/or the second wireless signal power information to the second power threshold comprises comparing the first wireless signal power information to the first power threshold and transmitting the data to the receiver or determining not to transmit the data to the receiver comprises determining not to transmit the data responsive to the first wireless signal power information including a power value that is not less than the first power threshold.

In some embodiments, responsive to the first wireless signal power information including a power value that is less than the first power threshold, methods include sending a sensing request from the transceiver to the receiver to request that the receiver determine the second wireless signal power information and receiving the second wireless signal power information from the receiver.

Some embodiments provide that, responsive to the first wireless signal power information including a power value that is not less than the first power threshold, operations comprise determining not to send a sensing request from the transceiver to the receiver.

In some embodiments, comparing the first wireless signal power information to the first power threshold and/or the second wireless signal power information to the second power threshold comprises comparing the second wireless signal power information to the second power threshold, and transmitting the data to the receiver or determining not to transmit the data to the receiver comprises determining not to transmit the data responsive to the second wireless signal power information including a power value that is not less than the second power threshold.

In some embodiments, responsive to the second wireless signal power information including a power value that is less than the second power threshold, transmitting the data to the receiver.

Some embodiments provide that receiving the second wireless signal power information is performed over a licensed channel and/or an unlicensed channel.

Some embodiments are directed to a wireless communication device that includes a transceiver to provide wireless communication over a radio interface, at least one processor coupled to the transceiver, and at least one memory coupled to the at least one processor and storing program code that when executed by the at least one processor causes the at least one processor to perform operations comprising determining a first wireless signal power information at the transceiver, receiving, from a receiver, second wireless signal power information at the receiver, comparing the first wireless signal power information to a first power threshold and/or the second wireless signal power information to a second power threshold, and based on comparing the first wireless signal power information to the first power threshold and/or the second wireless signal power information to the second power threshold, transmitting the identified data to the receiver or determining not to transmit the identified data to the receiver.

Some embodiments include determining whether the identified data corresponds to a narrow transmission in a beam direction or wide beam in an omni direction. In some embodiments, responsive to the identified data corresponding to the narrow transmission in the beam direction, determining the first wireless signal power information at the transmitter comprises determining the first wireless signal power information in the beam direction at the transmitter, and responsive to the identified data corresponding to the wide transmission in the omni direction, determining the first wireless signal power information at the transmitter comprises determining the first wireless signal power information in the omni direction at the transmitter.

In some embodiments, receiving, into the transmitter, the second wireless signal power information at the receiver comprises receiving the second wireless signal power information as aperiodic data that is received other than at regular time intervals. Operations may include sending a sensing request from the transmitter to the receiver to request that the receiver determine the second wireless signal power information and receiving the second wireless signal power information from the receiver.

Some embodiments provide that transmitting the identified data to the receiver or determining not to transmit the data to the receiver comprises determining not to transmit the data responsive to the first wireless signal power information including the power value that is not less than the first power threshold.

In some embodiments, responsive to the first wireless signal power information including a power value that is less than the first power threshold, operations comprise sending a sensing request from the transmitter to the receiver to request that the receiver determine the second wireless signal power information, and receiving the second wireless signal power information from the receiver. Some embodiments provide that comparing the first wireless signal power information to the first power threshold and/or the second wireless signal power information to the second power threshold comprises comparing the second wireless signal power information to the second power threshold and that transmitting the identified data to the receiver or determining not to transmit the identified data to the receiver comprises determining not to transmit the data responsive to the second wireless signal power information including a power value that is not less than the second power threshold. In some embodiments, responsive to the second wireless signal power information including a power value that is less than the second power threshold, the identified data is transmitted to the receiver.

Some embodiments are directed to computer program products that include a computer readable storage medium having computer readable code embodied in the computer readable storage medium that when executed by a processor of a wireless communication device causes the wireless communication device to perform operations. Operations include determining a first wireless signal power information at a transmitter, receiving, from a receiver, second wireless signal power information at the receiver, comparing the first wireless signal power information to a first power threshold and/or the second wireless signal power information to a second power threshold, and based on comparing the first wireless signal power information to the first power threshold and/or the second wireless signal power information to the second power threshold, transmitting the identified data to the receiver or determining not to transmit the identified data to the receiver.

Some embodiments are directed to a network node that includes a transmitter module in the network node that identifies data to transmit according to a data transmission scheme to a receiver in a wireless communication network, a first determining module at the transmitter in the wireless communication network that is configured to determine first wireless signal power information at the transmitter, a receiving module that is configured to receive a second wireless signal power information at the receiver, a comparing module that is configured to compare the first wireless signal power information to a first power threshold and/or the second wireless signal power information to a second power threshold, and a second determining module that is configured to determine whether to transmit identified data to the receiver based on comparing the first wireless signal power information to the first power threshold and/or the second wireless signal power information to the second power threshold. Some embodiments provide that the transmitter module is configured to transmit the identified data to the receiver responsive to the second determining module determining to transmit the identified data to the receiver.

Some embodiments are directed to a device in a wireless communication network. The device may include a receiver that is configured to send the second wireless signal power information to a transmitter and to receive data from the transmitter according to a transmission scheme at the transmitter, that uses first wireless signal power information corresponding to the transmitter and the second wireless signal power information corresponding to the receiver as a basis for determining whether or not to transmit the data according to the transmission scheme.

In some embodiments, responsive to the transmitter determining that the data transmission scheme corresponds to a narrow transmission in a beam direction, the receiver is configured to determine the second wireless signal power information in a direction corresponding to the beam direction.

Some embodiments provide that, responsive to the transmitter determining that the data transmission scheme corresponds to a wide transmission in an omni direction, the receiver is configured to determine the second wireless signal power information in the omni direction.

In some embodiments, the second wireless signal power information is sent as periodic data that is sent by the receiver at regular time intervals.

Some embodiments provide that the second wireless signal power information is sent as aperiodic data that is received other than at regular time intervals.

In some embodiments, the second wireless signal power information is aperiodic data that is sent at scheduled transmission times.

Some embodiments include receiving a sensing request from the transmitter to request that the receiver determine the second wireless signal power information and send the second wireless signal power information to the transmitter in response to the sensing request, and sending the second wireless signal power information to the transmitter.

BRIEF DESCRIPTION OF THE DRAWINGS

The drawings illustrate selected embodiments of the disclosed subject matter. In the drawings, like reference labels denote like features.

DETAILED DESCRIPTION

Figure 1:
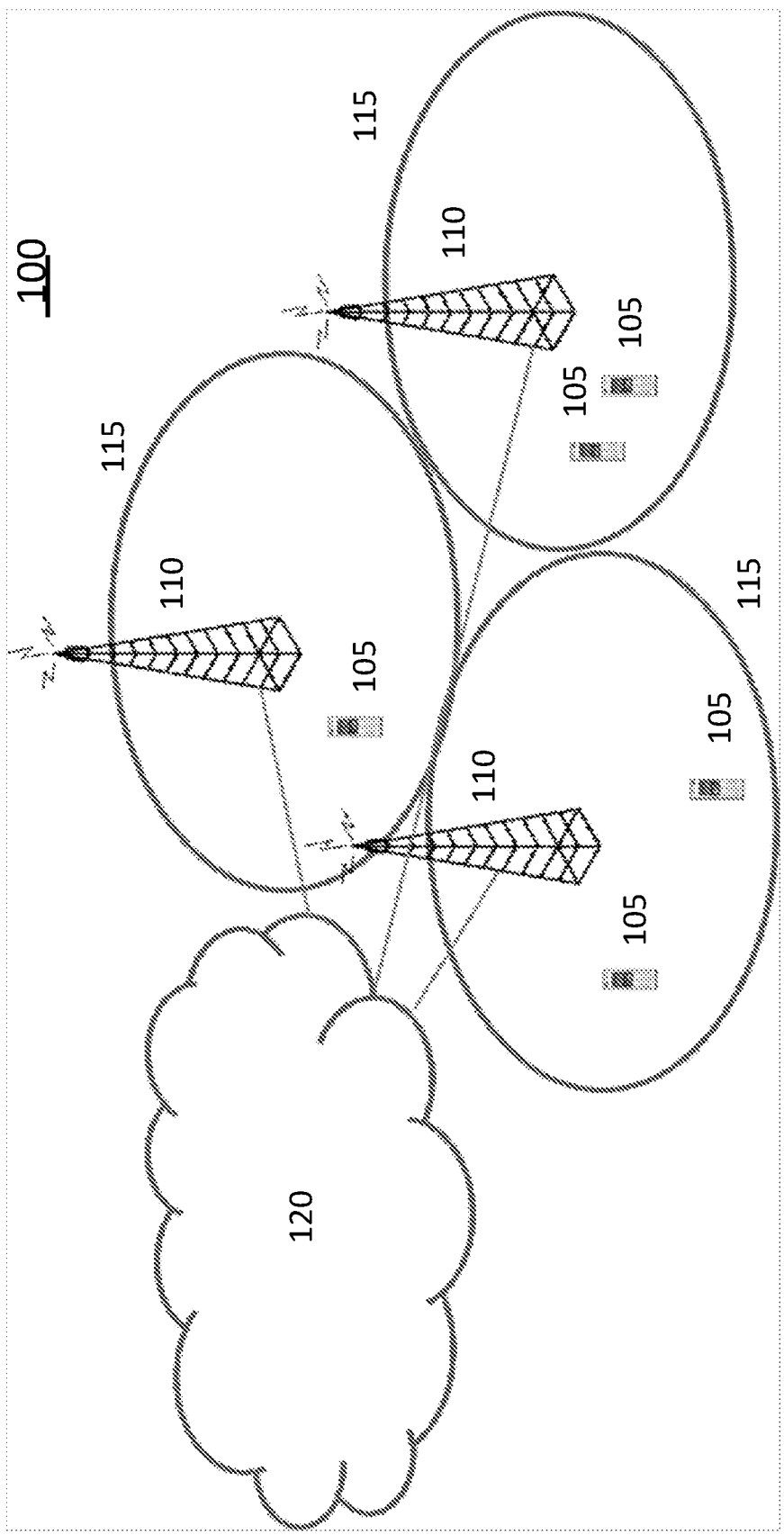
FIG. 1 is a diagram illustrating a wireless network according to some embodiments.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment. Any two or more embodiments described below may be combined in any way with each other. Moreover, certain details of the described embodiments may be modified, omitted, or expanded upon without departing from the scope of the described subject matter.

Note that terminology such as base station, 5G base station, NR base station, NodeB, gNode B or eNode B and UE should be considering non-limiting and does in particular not imply a certain hierarchical relation between the two; in general "NodeB" could be considered as device 1 and "UE" device 2, and these two devices communicate with each other over some radio channel. A generic term network node is used in some embodiments. The network node can be a base station, access point, RRH, RRU, radio network node, gNodeB, transmission reception point (TRP), NodeB or eNode B a core network node (e.g., MME, SON node, positioning node, MDT node, MCE, MBMS node etc). A generic term wireless device is used in some embodiments. The wireless device can be any type of UE such as LTE UE, New Radio (NR) UE, NB-IoT UE, M2M UE, V2V UE, V2X UE, UE of particular category (e.g. UE category NB1, UE category M1, UE category 0 etc) etc. A generic term radio node used herein may be a network node or a wireless device.

In some embodiments, a term operating bandwidth (BW) is used. Over the operating BW the network node transmits to and/or receives signal from one or more UEs in a cell. The operating bandwidth is interchangeably called as channel bandwidth, system bandwidth, transmission bandwidth, cell bandwidth, cell transmission BW, carrier bandwidth etc. The operating BW may be expressed in different units. Examples of units are KHz, MHz, number of resource blocks, number of resource elements, number of subcarriers, number of physical channels, number of frequency resource units etc. The frequency channel or carrier frequency over which a RAT operates is enumerated or addressed by a channel number aka absolute radio frequency channel number (ARFCN) e.g. E-UTRA ARFCN (EARFCN) in LTE and/or NR, among others.

In some embodiments, a signal can be an uplink (UL) signal, a downlink (DL) signal or a sidelink (SL) signal. An uplink signal, which is transmitted by the wireless device, can be a physical signal or a physical channel. Examples of uplink physical signal are SRS, DMRS etc. Examples of uplink physical channel are PUCCH, PUSCH, NPUSCH, NPUCCH, PRACH, NPRACH etc. A DL signal, which is transmitted by the network node, can be a physical signal or a physical channel. Examples of DL physical signal are CRS, DMRS, PRS, CSI-RS etc. Examples of downlink physical channels are PDCCH, PDSCH, NPDSCH, NPDCCH, PMCH etc. A sidelink (SL) signal, which is transmitted by a UE capable of direct UE to UE operation (aka D2D operation, V2V operation etc), can be a physical signal or a physical channel. Examples of SL physical signal are SLSS, DMRS etc. Examples of SL physical channel are PSSCH, PSCCH, PSDCH, PSBCH etc.

The term "numerology" used herein may refer to any one or more attributes defining signal characteristics. Examples of such attributes are: subcarrier spacing, symbol duration, CP duration (aka CP length), time slot duration, subframe duration, number of subcarriers per physical channel, number of physical channels within the bandwidth, etc. A physical channel used herein refers to any time-frequency radio resource. Examples of physical channels are resource block (RB), physical RB (PRB), virtual RB (VRB) etc.

The term "time resource" used herein may correspond to any type of physical resource or radio resource expressed in terms of length of time. Examples of time resources are:

symbol, time slot, subframe, short subframe, mini-slot, radio frame, TTI, interleaving time, etc.

The term FeMBSFN subframe may comprise, e.g., an MBSFN subframe configured according to eMBMS enhancements described in Section 2.1.1.1 (e.g., with new numerology, 1.25 kHz subcarrier spacing, in subframe #0, #4, #5, #9, etc.). The term mixed cell unicast/FeMBSFN subframes may comprise e.g. a cell transmitting one or more FeMBSFN subframes and one or more subframe with at least unicast data or PDSCH.

As used herein, a "radio node" is either a radio access node or a wireless device.

As used herein, a "radio access node" is any node in a radio access network of a cellular communications network that operates to wirelessly transmit and/or receive signals. Some examples of a radio access node include, but are not limited to, a base station (e.g., an enhanced or evolved Node B (eNB) in a Third Generation Partnership Project (3GPP) Long Term Evolution (LTE) network), a next generation Node B (gNB) in NR, a high-power or macro base station, a low-power base station (e.g., a micro base station, a pico base station, a home eNB, or the like), and a relay node.

As used herein, a "core network node" is any type of node in a Core Network (CN). Some examples of a core network node include, e.g., a Mobility Management Entity (MME), a Packet Data Network (PDN) Gateway (P-GW), a Service Capability Exposure Function (SCEF), or the like.

As used herein, a "wireless device" is any type of device that is capable of wirelessly transmitting and/or receiving signals to/from another wireless device or to/from a network node in a cellular communications network to obtain has access to (i.e., be served by) the cellular communications network. Some examples of a wireless device include, but are not limited to, a User Equipment device (UE) in a 3GPP network, a Machine Type Communication (MTC) device, an NB-IoT device, an FeMTC device, etc.

As used herein, a "network node" is any node that is used and can correspond to any type of radio network node or any network node, which communicates with a UE and/or with another network node. Examples of network nodes are NodeB, MeNB, SeNB, a network node belonging to MCG or SCG, base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc.), O&M, OSS, SON, positioning node (e.g. E-SMLC), MDT, etc.

As used herein, the non-limiting term user equipment (UE) is used and it refers to any type of wireless device communicating with a network node and/or with another UE in a cellular or mobile communication system. Examples of UE are target device, device to device (D2D) UE, machine type UE or UE capable of machine to machine (M2M) communication, PDA, PAD, Tablet, mobile terminals, smart phone, laptop embedded equipped (LEE), laptop mounted equipment (LME), USB dongles, ProSe UE, V2V UE, V2X UE, etc.

As used herein, the non-limiting term WAN (wireless access network or RAN, radio access network) node can be a UE or a network node (e.g. access point, BS etc.) The WAN node may be interchangeably called as cellular node, NW source node etc.

Note that the description given herein focuses on a 3GPP cellular communications system and, as such, 3GPP LTE terminology or terminology similar to 3GPP LTE terminology is oftentimes used. However, the concepts disclosed herein are not limited to LTE or a 3GPP system. Moreover, in the description herein, reference may be made to the term "cell;" however, particularly with respect to Fifth Generation (5G) concepts, beams may be used instead of cells and, as such, it is important to note that the concepts described herein are equally applicable to both cells and beams. Further, an LAA mechanism according to embodiments herein may be used for New Radio (NR).

According to some embodiments, for a node to be allowed to transmit in unlicensed spectrum, it typically needs to perform a clear channel assessment (CCA) or Listen Before Talk (LBT) mechanism. This procedure typically includes sensing the medium to be idle for a number of time intervals. After sensing the medium idle a node is typically allowed to transmit for a certain amount of time, sometimes referred to as transmission opportunity (TXOP). The length of the TXOP depends on regulation and type of CCA that has been performed, but typically ranges from 1 ms to 10 ms.

In current unlicensed networks, the decision to transmit may only be based on the LBT outcome at the transmitter. For example, if the transmission is scheduled and the transmitter senses that the medium is idle, the transmitter will start the transmission. However, the current transmission mechanism may not address issues corresponding to hidden nodes and exposed nodes.

Figure 6:
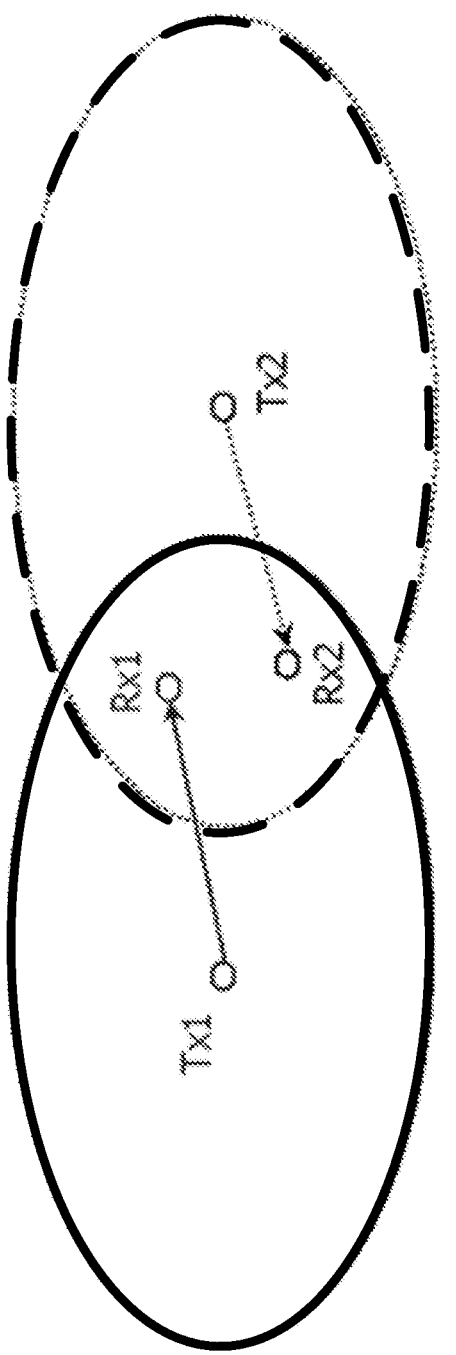
FIG. 6 is a schematic diagram illustrating a hidden node scenario in a further enhanced license assisted access network.

Brief reference is now made to FIG. 6, which is a schematic diagram illustrating a hidden node scenario in a further enhanced license assisted access network. As illustrated, transmitter 2 (Tx2) may not sense the active link from transmitter 1 (Tx1) to receiver 1 (Rx1). In this regard, transmitter Tx2 may start its transmission without being aware of the proximity between receivers Rx1 and Rx2. As such, the transmission between transmitter Tx1 and receiver Rx1 may suffer interference from a transmission from Tx2. Accordingly, a hidden node may increase the probability of unintentionally creating interference to other networks.

Figure 7:
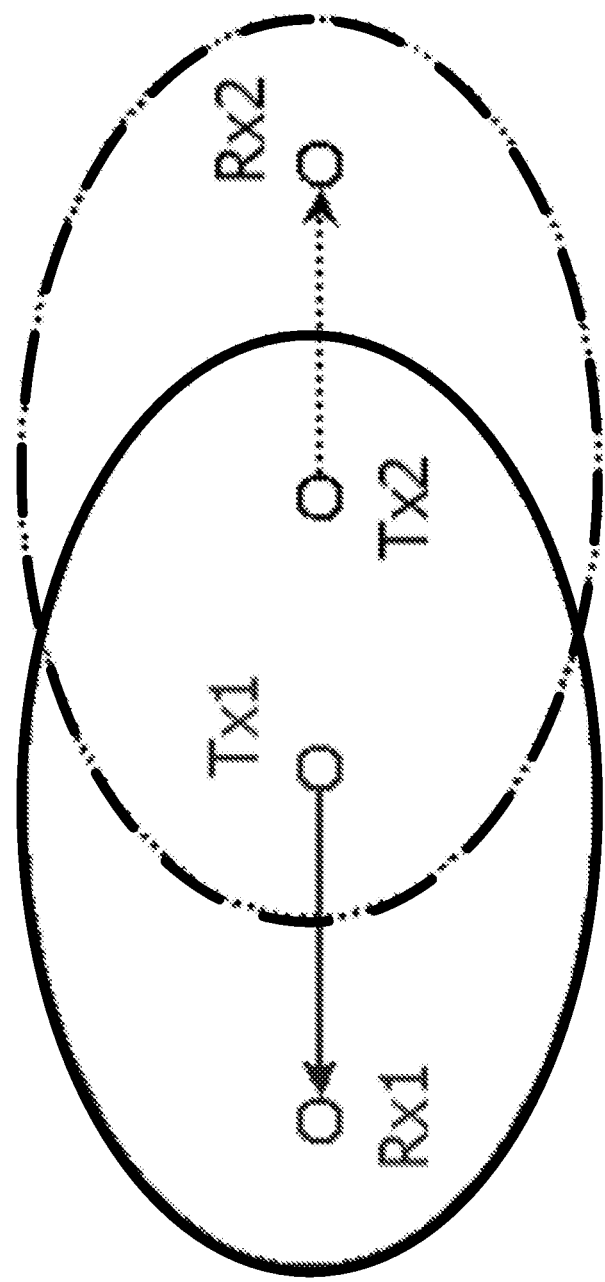
FIG. 7 is a schematic diagram illustrating an exposed node scenario in a further enhanced license assisted access network.

Brief reference is now made to FIG. 7, which is a schematic diagram illustrating an exposed node scenario in a further enhanced license assisted access network. As illustrated, transmitter Tx2 senses the transmission from transmitter Tx1 to receiver Rx1. As a result, transmitter Tx2 determines that the channel is busy and does not proceed with a planned transmission to receiver Rx2, even though such transmission from Tx1 may not interfere with a transmission to receiver Rx2. Accordingly, an exposed node may prevent a network resource from being used efficiently.

In view of the hidden and exposed nodes, methods, system and apparatus herein may provide that a transmitter makes the transmission decisions based not only on a LBT outcome at the transmitter but also on a channel sensing result at the receiver. For example, at a high level, assuming that the transmitter senses no or weak interference around it, but the receiver senses strong interference, the transmitter may determine not to make a planned transmission. Further, responsive to the transmitter sensing some interference around it and the receiver sensing no or very weak interference, the transmitter may determine to initiate the transmission.

By using the channel sensing result at the receiver and the LBT for the scheduling decisions, the proposed scheme can reduce the likelihood corresponding to hidden node and exposed node problems. As such, the probability of unintentionally creating interference to other networks may be reduced, thus providing friendly coexistence with other networks, while the resource efficiency may be increased thus improving system performance.

The described embodiments may be implemented in any appropriate type of communication system supporting any suitable communication standards and using any suitable components. As one example, certain embodiments may be implemented in an LTE network, such as that illustrated in FIG. 1. Although certain embodiments are described with respect to LTE systems and related terminology, the disclosed concepts are not limited to LTE or a 3GPP system. Additionally, although reference may be made to the term "cell", the described concepts may also apply in other contexts, such as beams used in Fifth Generation (5G) systems, for instance.

Reference is now made to FIG. 1, which is a diagram illustrating an LTE network according to some embodiments. A communication network 100 comprises multiple wireless devices 105 and multiple radio access nodes 110. Communication network 100 is organized into cells 115, which are connected to a core network 120 via corresponding radio access nodes 110. Radio access nodes 110 are capable of communicating with wireless communication devices 105 along with any additional elements suitable to support communication between wireless communication devices or between a wireless communication device and another communication device (such as a landline telephone).

Figure 2A:
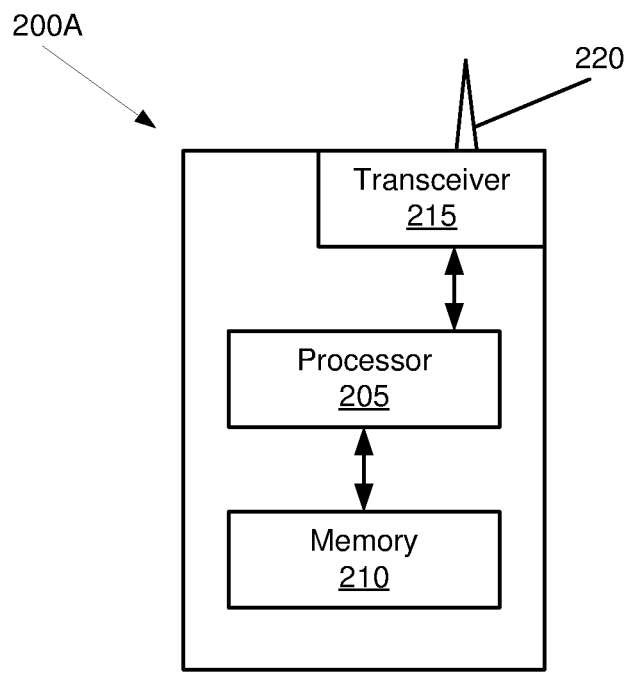
FIGS. 2A and 2B are diagram illustrating wireless devices according to some embodiments.
Figure 2B:
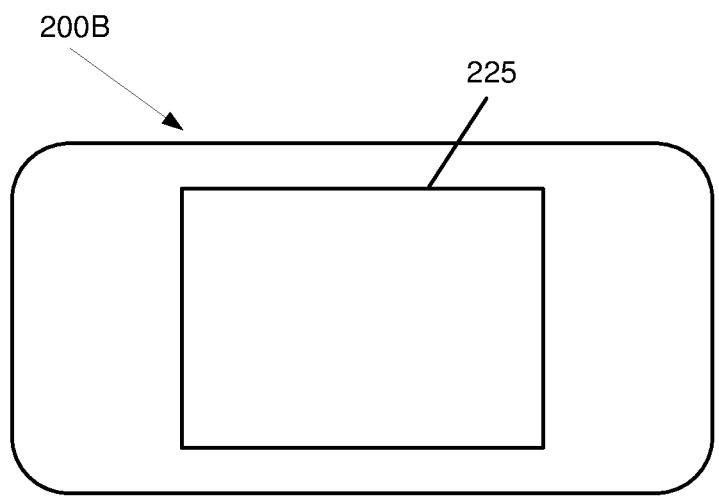

Although wireless devices 105 may represent communication devices that include any suitable combination of hardware and/or software, these wireless devices may, in certain embodiments, represent devices such as an example wireless device illustrated in greater detail by FIGS. 2A and 2B. Similarly, although the illustrated radio access node may represent network nodes that include any suitable combination of hardware and/or software, these nodes may, in particular embodiments, represent devices such those illustrated in greater detail by FIGS. 3A, 3B and 4.

The wireless communication device 200A, which may be referred to herein as a UE 200, (also referred to as a wireless terminal, a wireless communication device, a wireless communication terminal, user equipment, a user equipment node/terminal/device, etc.) may be configured to provide operations according to embodiments of inventive concepts. Referring to FIG. 2A, a wireless communication device 200A includes a processor circuit 205, also referred to as a processor, (e.g., Central Processing Units [CPUs], Application Specific Integrated Circuits [ASICs], Field Programmable Gate Arrays [FPGAs], and/or the like), a memory 210, a transceiver circuit 215, also referred to as a transceiver, and an antenna 220.

The processor 205 may be coupled to the transceiver 215 and the memory 210. The memory 210 may include computer readable program code that when executed by the processor 205 causes the processor 205 to perform operations according to embodiments disclosed herein for a wireless communication device 200A. According to other embodiments, processor 205 may be defined to include memory so that a separate memory circuit is not required. The wireless communication device 200A may also include an interface (such as a user interface) coupled with processor 205.

As discussed herein, operations of the wireless communication device 200A may be performed by the processor 205 and/or transceiver 215. For example, processor 205 may control transceiver 215 to transmit communications through transceiver 215 over a radio interface to another node and/or to receive communications through transceiver 215 from another node over a radio interface. Moreover, modules may be stored in memory 210, and these modules may provide instructions so that when instructions of a module are executed by processor 205, processor 205 performs respective operations (e.g., operations discussed below with respect to example embodiments).

In certain embodiments, some or all of the functionality described as being provided by UEs, MTC or M2M devices, and/or any other types of wireless communication devices may be provided by the device processor executing instructions stored on a computer-readable medium, such as the memory shown in FIG. 2A. Some embodiments include additional components beyond those shown in FIG. 2A that may be responsible for providing certain aspects of the device's functionality, including any of the functionality described herein.

Referring to FIG. 2B, a wireless communication device 200B comprises at least one module 225 configured to perform one or more corresponding functions. Examples of such functions include various method steps or combinations of method steps as described herein with reference to wireless communication device(s). In general, a module 225 may comprise any suitable combination of software and/or hardware configured to perform the corresponding function. For instance, in some embodiments a module 225 comprises software configured to perform a corresponding function when executed on an associated platform, such as that illustrated in FIG. 2A.

Figure 3A:
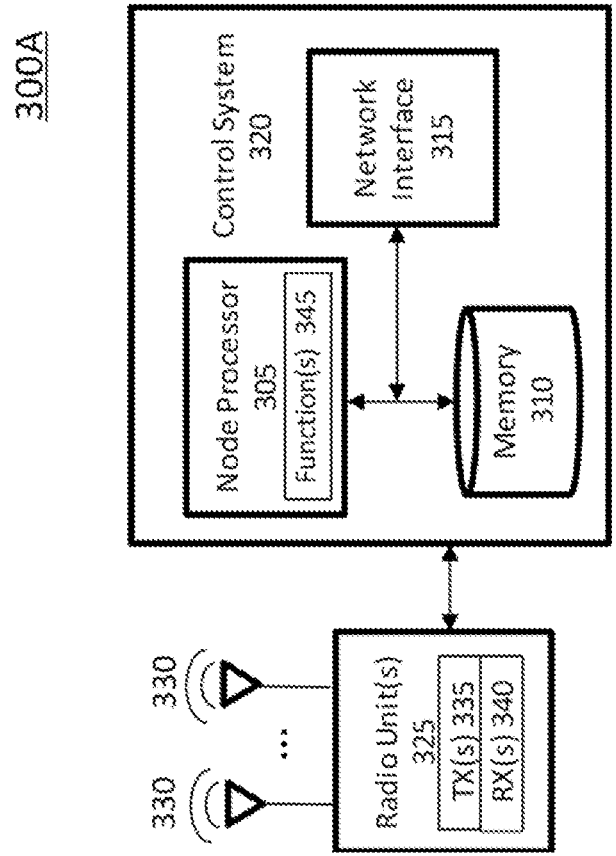
FIGS. 3A and 3B, which are schematic block diagrams illustrating radio access nodes corresponding to some embodiments herein.
Figure 3B:
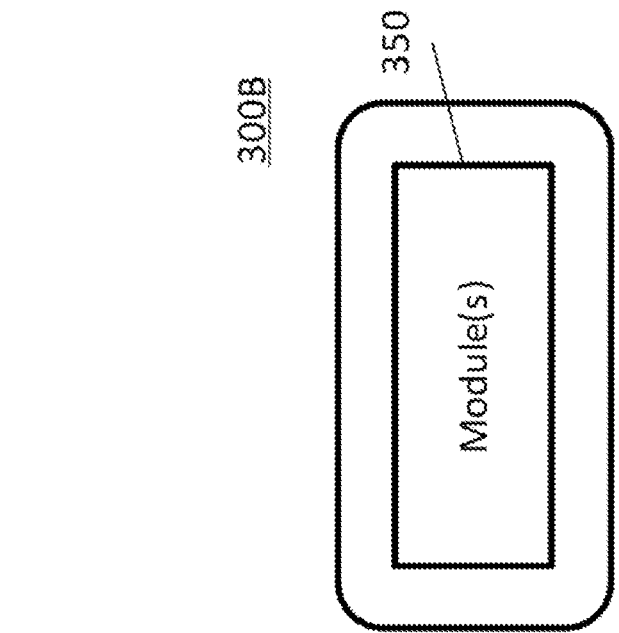

Reference is now made to FIGS. 3A and 3B, which are schematic block diagrams illustrating radio access nodes corresponding to some embodiments herein. Referring to FIG. 3A, a radio access node 300A includes a control system 320 that includes a node processor 305 (e.g., Central Processing Units (CPUs), Application Specific Integrated Circuits (ASICs), Field Programmable Gate Arrays (FPGAs), and/or the like), memory 310, and a network interface 315. In addition, radio access node 300A includes at least one radio unit 325 including at least one transmitter 335 and at least one receiver coupled to at least one antenna 330. In some embodiments, radio unit 325 is external to control system 320 and connected to control system 320 via, e.g., a wired connection (e.g., an optical cable). However, in some other embodiments, radio unit 325 and potentially the antenna 330 are integrated together within control system 320. Node processor 305 operates to provide at least one function 345 of radio access node 300A as described herein. In some embodiments, the function(s) are implemented in software that is stored, e.g., in the memory 310 and executed by node processor 305.

In certain embodiments, some or all of the functionality described as being provided by a base station, a node B, an enodeB, a gNB, and/or any other type of network node may be provided by node processor 305 executing instructions stored on a computer-readable medium, such as memory 310 shown in FIG. 3A. In some embodiments, a radio access node 300 may include additional components to provide additional functionality, such as the functionality described herein and/or related supporting functionality.

Referring to FIG. 3B, a radio access node 300B includes at least one module 350 configured to perform one or more corresponding functions. Examples of such functions include various method steps and/or operations or combinations of method steps and/or operations as described herein with reference to radio access node(s). In general, a module 350 may include any suitable combination of software and/or hardware configured to perform the corresponding function. For instance, in some embodiments a module includes software configured to perform a corresponding function when executed on an associated platform, such as that illustrated in FIG. 3A.

Figure 4:
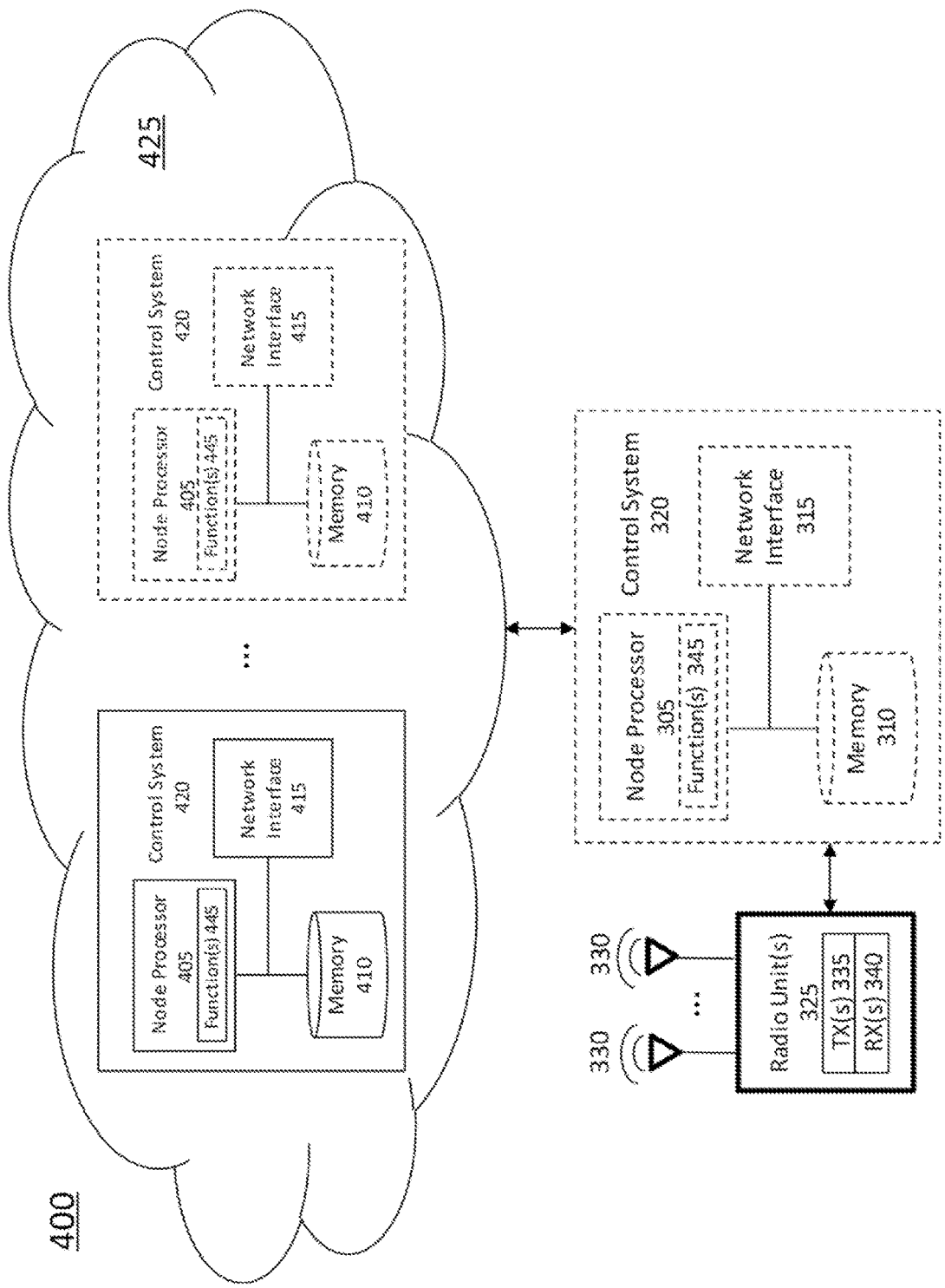
FIG. 4 is a block diagram that illustrates a virtualized radio access node according to some embodiments herein.
Figure 5:
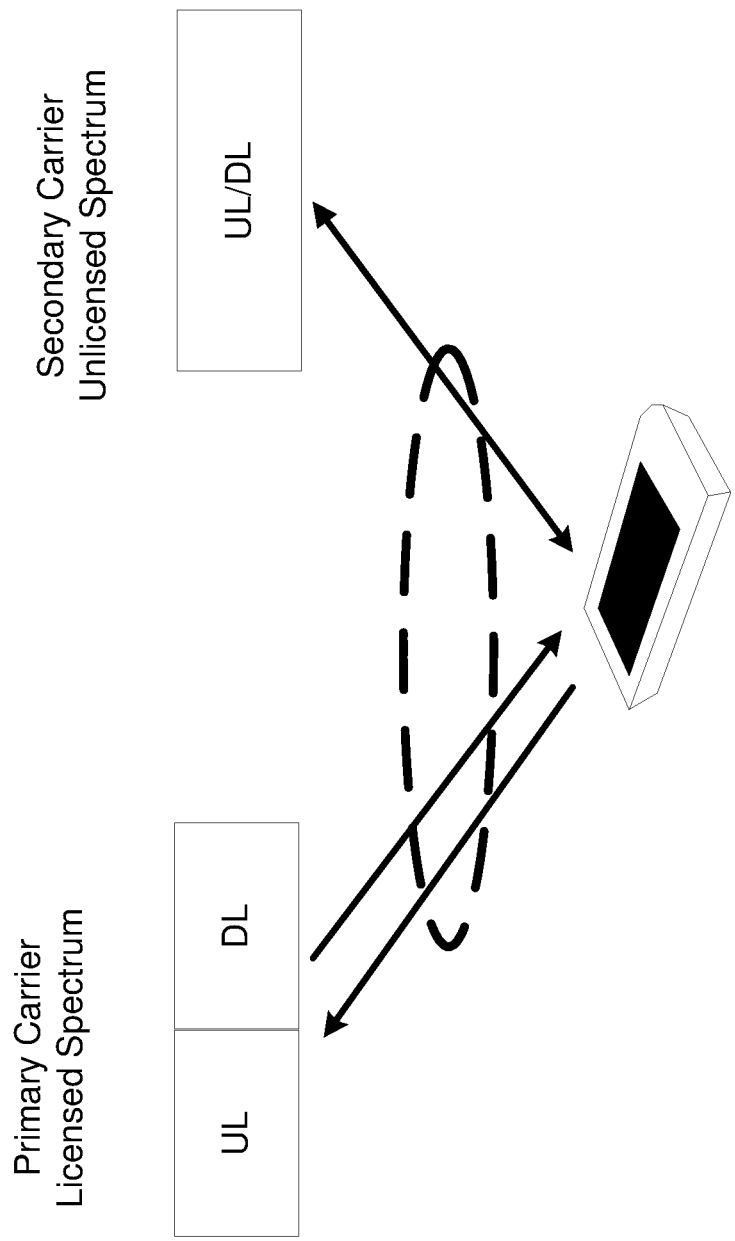
FIG. 5 is a schematic diagram illustrating primary and secondary carriers operating in a further enhanced license assisted access network.

FIG. 4 is a block diagram that illustrates a virtualized radio access node 400 according to some embodiments herein. The concepts described in relation to FIG. 4 may be similarly applied to other types of network nodes. Further, other types of network nodes may have similar virtualized architectures. As used herein, the term "virtualized radio access node" refers to an implementation of a radio access node in which at least a portion of the functionality of the radio access node is implemented as a virtual component(s) (e.g., via a virtual machine(s) executing on a physical processing node(s) in a network(s)).

Referring to FIG. 4, radio access node 400 comprises control system 320 as described above regarding FIG. 3A.

Control system 320 is connected to one or more processing nodes 420 coupled to or included as part of a network(s) 425 via network interface 315. Each processing node 420 may include one or more processors 405 (e.g., CPUs, ASICs, FPGAs, and/or the like), memory 410, and a network interface 415.

In some embodiments, functions 345 of radio access node 300A described herein may be implemented at the one or more processing nodes 420 and/or distributed across control system 320 and the one or more processing nodes 420 in any desired manner. In some embodiments, some or all of the functions 345 of radio access node 300A described herein are implemented as virtual components executed by one or more virtual machines implemented in a virtual environment(s) hosted by processing node(s) 420. Additional signaling and/or communication between processing node(s) 420 and control system 320 may be used in order to carry out at least some of the desired functions 345. As indicated by dotted lines, in some embodiments control system 320 may be omitted, in which case the radio unit(s) 325 communicate directly with the processing node(s) 420 via an appropriate network interface(s).

Figure 8:
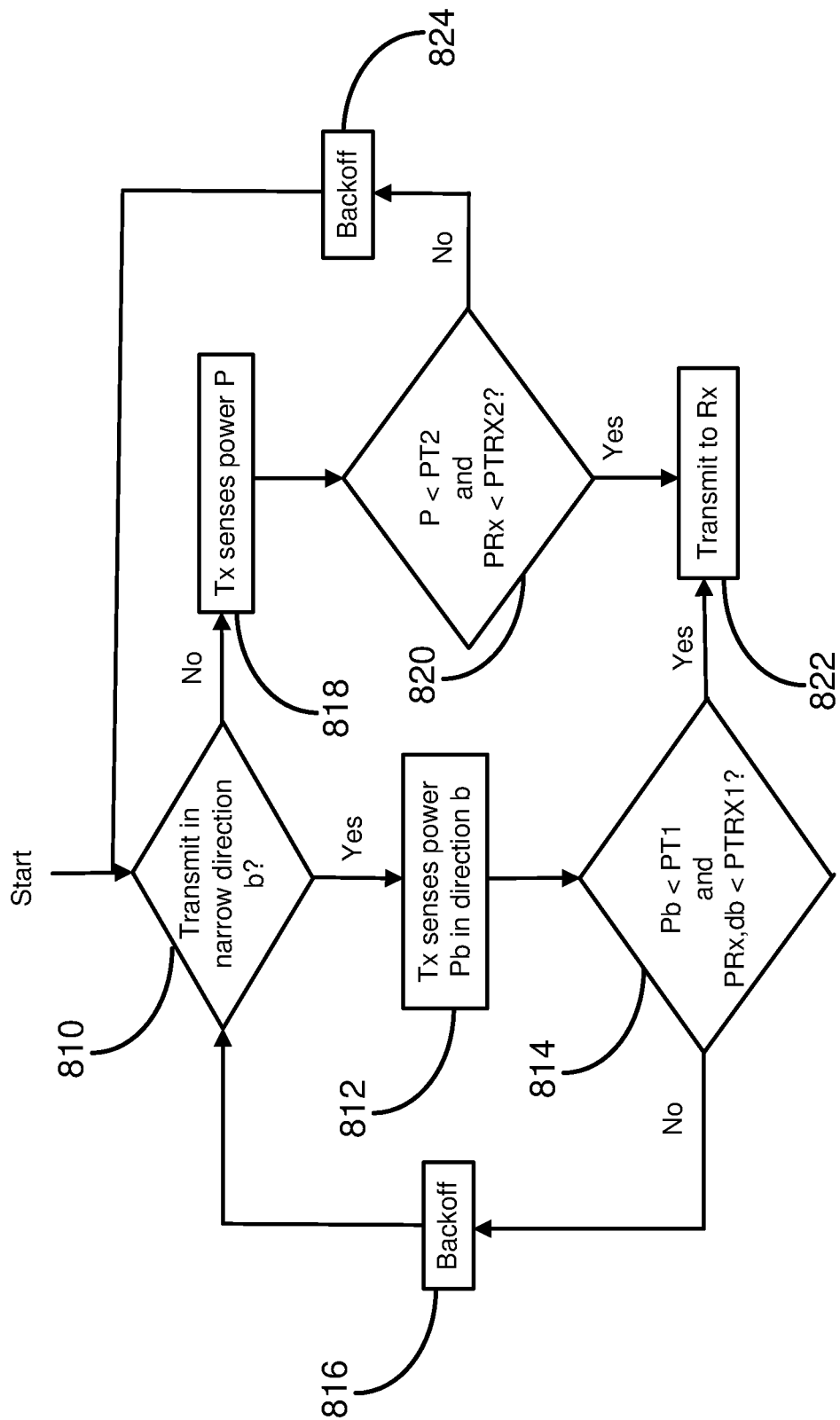
FIG. 8 is a flowchart illustrating operations for receiving sensing and scheduling in a further enhanced license assisted access network.

Some embodiments of the present disclosure provide that the transmitter uses a sensing result that is determined at the receiver at the receiver for a transmission decision. Reference is now made to FIG. 8, is a flowchart illustrating operations for receiving sensing and scheduling in a further enhanced license assisted access network.

Responsive to the data for transmission arriving at the transmitter, operations include determining if the data will be transmitted with a narrow beam pointing in a certain direction b (block 810). If the data is not to be transmitted with a narrow beam in the direction b, then the transmitter performs power detection in an omni direction (block 818), as may be done with a LBT to detect sensed power P. Operations then include determining whether the sensed power P in the omni direction at the transmitter is less than a power threshold $PT_2$ and/or the sensed power in the omni direction at the receiver, $P_{Rx}$, is less than a power threshold $P_{TRx,2}$ (block 820). If the sensed power P is greater than the power threshold $PT_2$ or the sensed power in the omni direction at the receiver, $P_{Rx}$, is greater than a power threshold $P_{TRx,2}$, the transmitter backs off (block 824) and does not transmit the data according to the LBT procedure.

If the sensed power P is not greater than the power threshold $PT_2$ and the sensed power in the omni direction at the receiver, $P_{Rx}$, is not greater than the power threshold $P_{TRx,2}$, the transmitter will transmit to the receiver (block 822). Hence, as a result, the requirement for transmission to the receiver may be more restricted relative to the classical LBT mechanism because the interference power at the receiver is also below a certain threshold. In this way, the packet loss probability may be lowered and the hidden node problem may be mitigated.

If the data is to be transmitted with a narrow beam in the direction b, then different thresholds may be applied at the transmitter. Operations include the transmitter detecting the energy in the direction b only (block 812). Sensed power in the beam direction may be referred to as $P_b$. In some embodiments, the transmitter may receive, from the receiver, feedback corresponding to the interference sensed in the direction that is best aligned with the received signal from the transmitter when the transmitter transmits in direction b. This direction at the receiver may be referred to as $d_b$ and the corresponding interference power may be referred to as $P_{Rx,db}$.

Operations then include determining whether the sensed power $P_b$ in the direction b at the transmitter is less than a power threshold $PT_1$ and/or the sensed power in the direction b at the receiver, $P_{Rx,db}$ is less than a power threshold $P_{TRx,1}$ (block 814). If the sensed power $P_b$ in the direction b is greater than the power threshold $PT_1$ or the sensed power in the direction b at the receiver, $P_{Rx,db}$ is greater than a power threshold $P_{TRx,1}$, the transmitter backs off (block 816) and does not transmit the data according to the LBT procedure. If the sensed power $P_b$ in the direction b is not greater than the power threshold $PT_1$ and the sensed power in the direction b at the receiver, $P_{Rx,db}$ is not greater than the power threshold $P_{TRx,1}$, the transmitter will transmit to the receiver (block 822). Hence, as a result, the requirement for transmission to the receiver may be more restricted relative to the classical LBT mechanism because the interference power at the receiver is also below a certain threshold. In this way, the packet loss probability may be lowered and the hidden node problem may be mitigated.

Figure 9:
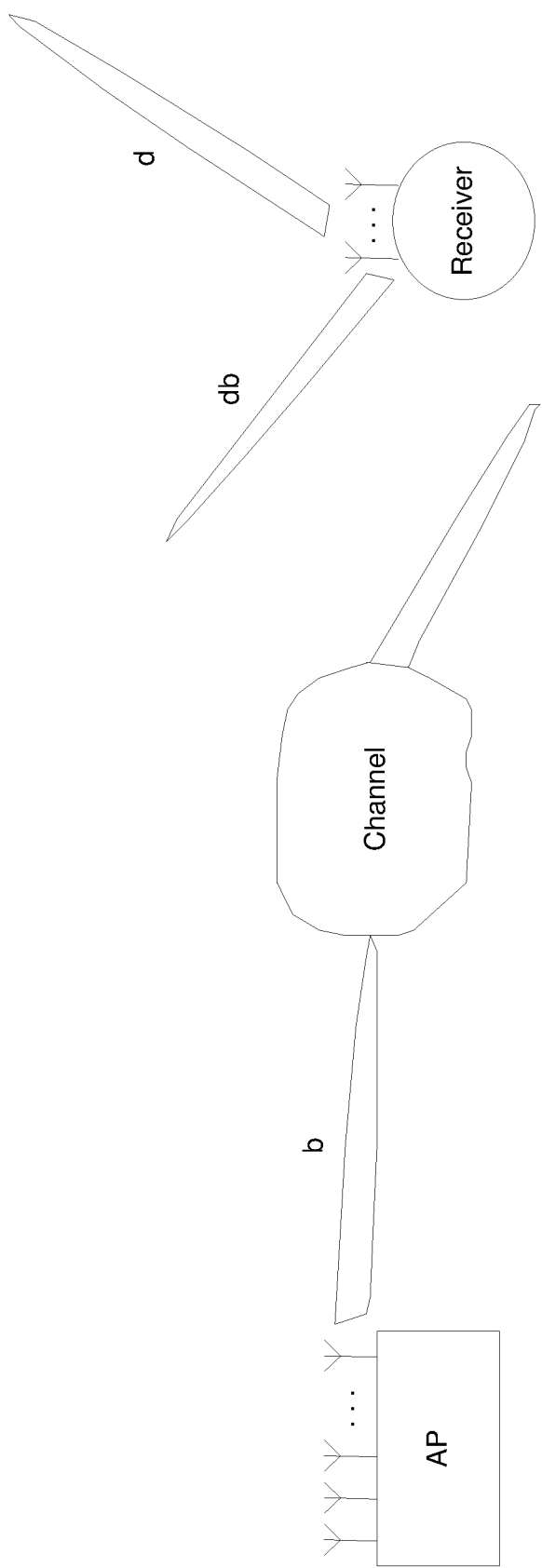
FIG. 9 is a schematic diagram illustrating a transmission of a signal beam in a further enhanced license assisted access network.

Brief reference is now made to FIG. 9, which is a schematic diagram illustrating a transmission of a signal beam in a further enhanced license assisted access network. As illustrated, direction $d_b$ may be related to direction b. For example, based on $P_b$ and $P_{Rx,d\_b}$, the transmitter may determine whether it should transmit the data to the receiver by comparing these values to pre-determined sensing thresholds. This may be similar to a determination when there is no narrow transmission.

Some embodiments provide that the transmitter performs energy detection around direction b because signals transmitted in this direction may cause interference at the unknown devices from which the interference was received. Moreover, interfering signals that are received within this direction at the transmitter may further propagate towards the receiver. Hence, if the interfering signals sensed in this direction at the transmitter are strong, they may also cause interference at the receiver when the receiver tunes in (on direction $d_b$) to receive data from the transmitter. In contrast, interference that is sensed at the transmitter in a direction d that is different from b will be unlikely to cause interference at the receiver. Similarly, the receiver only needs to sense interference around direction $d_b$, since it will receive the signal from the AP on this direction and all other directions may cause negligible interference. In the case when the receiver only has a single antenna, $P_{Rx,d\_b}$ corresponds to the interference sensed in all directions (i.e., the omni direction).

Referring to FIG. 9, some embodiments provide that the AP transmits a signal in (beam) direction b, which after the physical channel results in a signal direction that is different than b. The STA receives in (beam) direction $d_b$, which has been found to be the best direction on which to receive the signal from the AP when the AP transmits in direction b. In contrast, direction d is oriented significantly differently than the signal received from the AP. As such, direction d is not suitable to use for receiving the signal from the AP.

Figure 10:
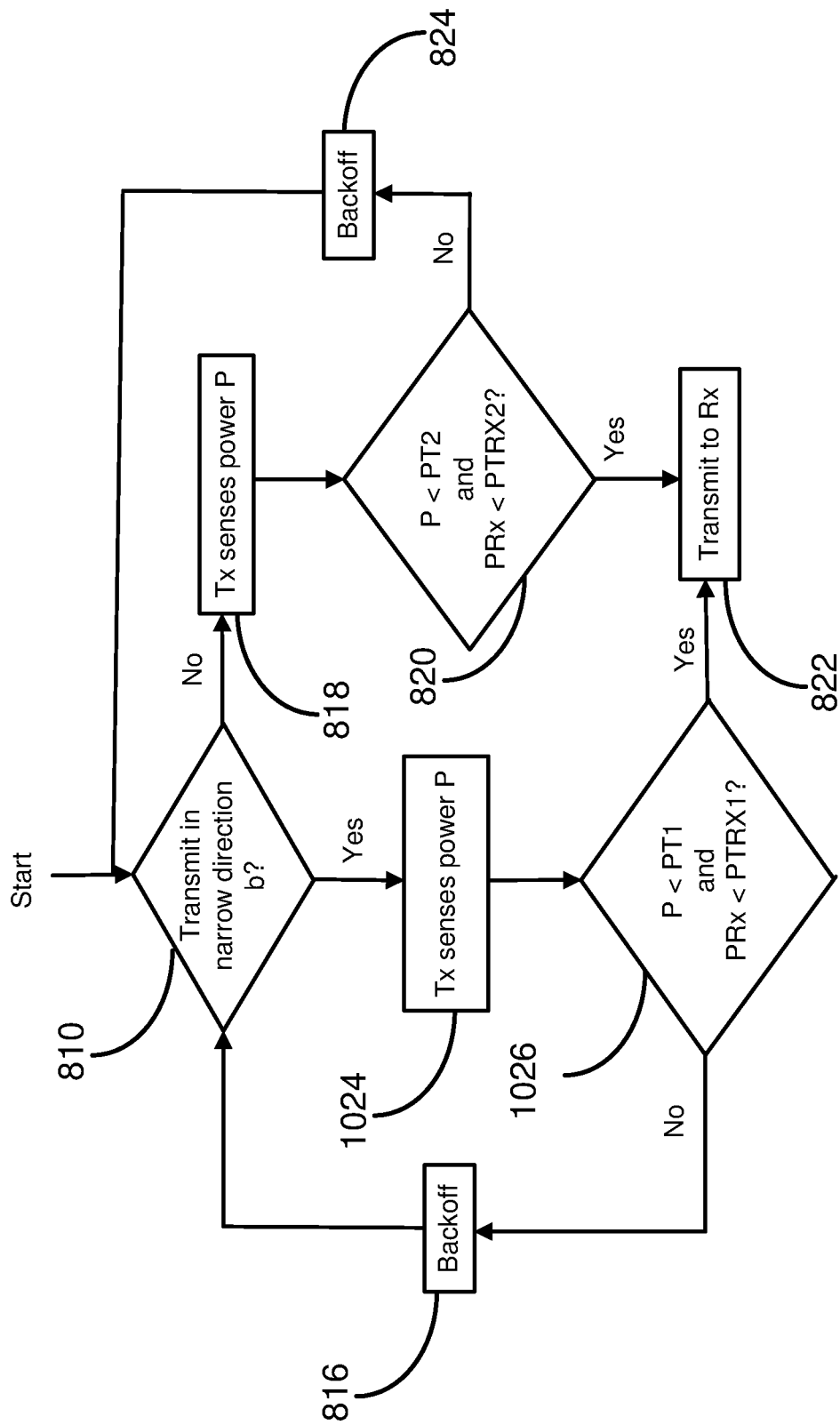
FIG. 10 is a flowchart illustrating operations in a further enhanced license assisted access network in which the transmitter is forced to do energy detection in an omni direction.

In some cases, due to regulations, a transmitter may be required to perform energy detection in the omni direction. In such circumstances, the measured power $P_b$ may be replaced by the omni measured power P. The receiver measurements and thresholds may be kept the same or different. For example, reference is now made to FIG. 10, which is a flowchart illustrating operations in a further enhanced license assisted access network in which the transmitter is required to do energy detection in an omni direction. The flowchart of FIG. 10 is similar to that of FIG. 8 as discussed above except that instead of sensing the narrow beam power in operation 812, FIG. 10 includes sensing the power P in the omni direction (block 1024). Operations then include determining whether the sensed power P in the omni-direction at the transmitter is less than a power threshold $PT_1$ and/or the sensed power in the omni-direction at the receiver, $P_{Rx}$ is less than a power threshold $P_{TRx,1}$ (block 1026). In this regard, the transmitter may perform energy detection in the omni direction, even when transmitting a narrow beam. Although discussed herein with respect to a single receiver, the methods, systems and apparatus herein may be applied to circumstances using multiple receivers. In such embodiments, the transmitter may make the scheduling decision based on the sensing reports from multiple receivers.

In some embodiments, the transmitter may obtain the sensing result from the receiver side. Some embodiments provide that this information can be signaled in the control channel in the licensed spectrum. In this manner, the receiver may not need to contend for resources in the channel. Thus, if the receiver senses strong interference, it may not back off from its transmission and instead may use the control channel for transmitting the sensing result to the transmitter.

In some embodiments, the sensing result at the receiver can be signaled periodically or aperiodically. If the receiver does not know when the data arrives, it can periodically signal its sensing result to the transmitter until the transmission is started. This option would may use heavy/periodic overhead, but can be applied for the scenarios of random access. For example, in a system supporting an autonomous UL, the gNB can periodically broadcast its sensing interference power in the common physical downlink control channel (C-PDCCH) to all UEs, who would like to access the channel randomly.

Some embodiments provide that the receiver can also signal its sensing result aperiodically. Examples of aperiodic signaling may include when a signal of a sensing result is scheduled and/or in response to receiving a request from the transmitter. In some embodiments, in order to reduce the signaling overhead, if the sensing power at the transmitter P is larger than the threshold $PT_j$, the transmitter may not send a sensing request to the receiver since the transmitter will backoff regardless the sensing result at the receiver. This option may be applied during the energy comparison step as discussed above. Some embodiments provide that this would not require periodic signaling from the receiver and would instead send the signal responsive to a sensing request from the transmitter. Such embodiments may result in a longer scheduling delay relative to other embodiments.

Figure 11:
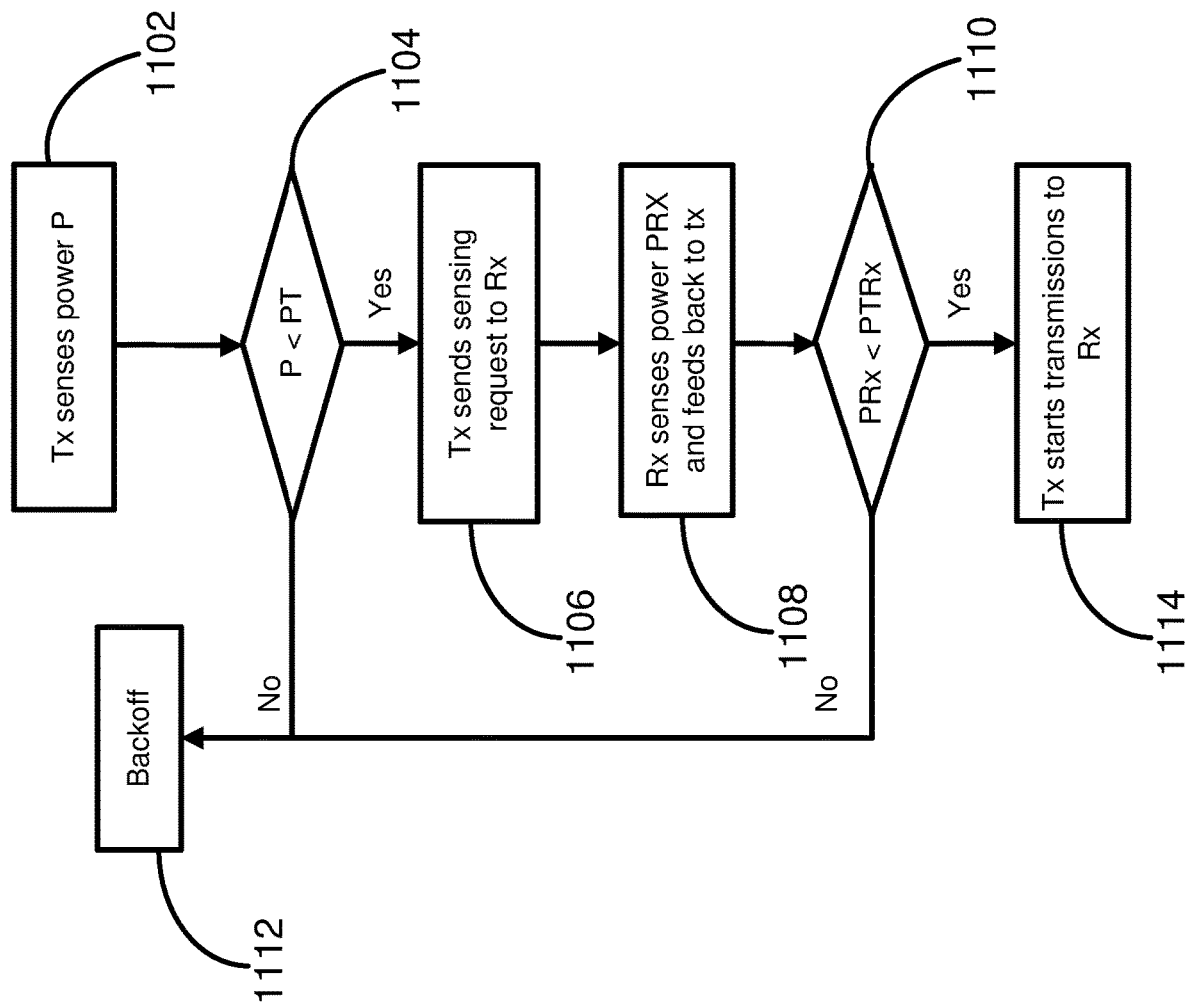
FIG. 11 is a flowchart illustrating operations in a further enhanced license assisted access network using an aperiodic sensing report.

Reference is now made to FIG. 11, which is a flowchart illustrating operations in a further enhanced license assisted access network using an aperiodic sensing report. Specifically, the flowchart of FIG. 11 is directed to operations corresponding to the embodiments including an on-demand aperiodic sensing report. For example, the transmitter Tx senses power P at the transmitter Tx (block 1102). The transmitter Tx determines if the sensed received power P at the transmitter Tx is less than a first power threshold PT (block 1104). If the sensed power P is not less than the first power threshold PT then the transmitter Tx will backoff and not send the planned transmission (block 1112).

If the transmitter Tx determines that the power sensed at the transmitter Tx is less than the first power threshold, then the transmitter Tx may send a sensing request to the receiver Rx (block 1106). In response to the message from the transmitter Tx, the receiver Rx may sense the power at the receiver Rx and send the information back to the transmitter Tx (block 1108). Thus, after sending the sensing request to the receiver, the transmitter Tx may receive the power sensed at the receiver Rx.

The transmitter Tx may determine if the power received at the receiver Rx is less than a second power threshold (block 1110). If the power received at the receiver Rx is less than the second power threshold then the transmitter Tx may start the transmissions to the receiver Rx (block 1114). If the power received at the receiver Rx is not less than the second power threshold, then the transmitter Tx will backoff and not send the planned transmission.

Sensing thresholds corresponding to systems, methods and apparatus disclosed herein may vary depending on whether or not the beam transmission is a narrow beam transmission or an omni beam transmission, which may depend on regulatory requirements. For example, in embodiments without a narrow beam transmission, if the sensing threshold $PT_1$ at the transmitter corresponds to a legacy LBT regulation (e.g., −72 dBm), the systems, methods and apparatus disclosed herein may mitigate the hidden node problem since the transmission decision is also based on the sensing result at the receiver.

If the sensing threshold $PT_1$ at the transmitter is allowed to increase to a higher value than the legacy LBT regulation, which may be reasonable since the additional sensing mechanism at the receiver is provided, then the system, methods and apparatus disclosed herein may mitigate the exposed node problem and allow the system to use the channel more efficiently.

In embodiments with a narrow beam transmission, if the directional sensing is not allowed and the transmitter is required to perform omni sensing, it may be reasonable to increase the sensing threshold at the transmitter since it is very likely that collisions only happen in the transmitted direction of the narrow beam, which is also sensed by the receiver.

If the directional sensing is allowed, the probability of transmission from the transmitter to the receiver is increased (i.e., the probability that the receiver senses interference in a certain, narrow, direction is lower than when sensing in omni mode). This may reduce the exposed node problem and allow the system to use the channel more efficiently. As used herein, the term wireless signal power information includes power and/or energy values that correspond to wireless signals that may be sensed at the transmitter and/or receiver.

Figure 12:
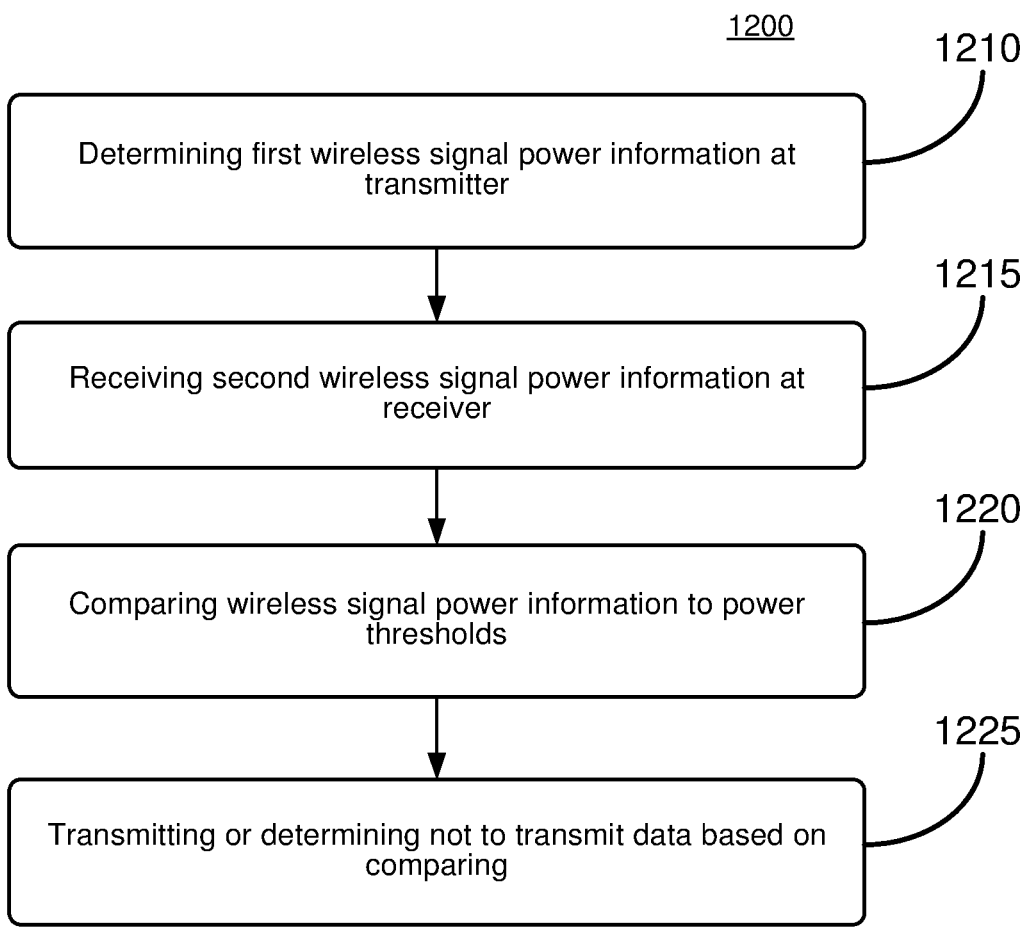
FIGS. 12-13 are flowcharts illustrating operations of methods of operating of a wireless device according to some embodiments herein.
Figure 13:
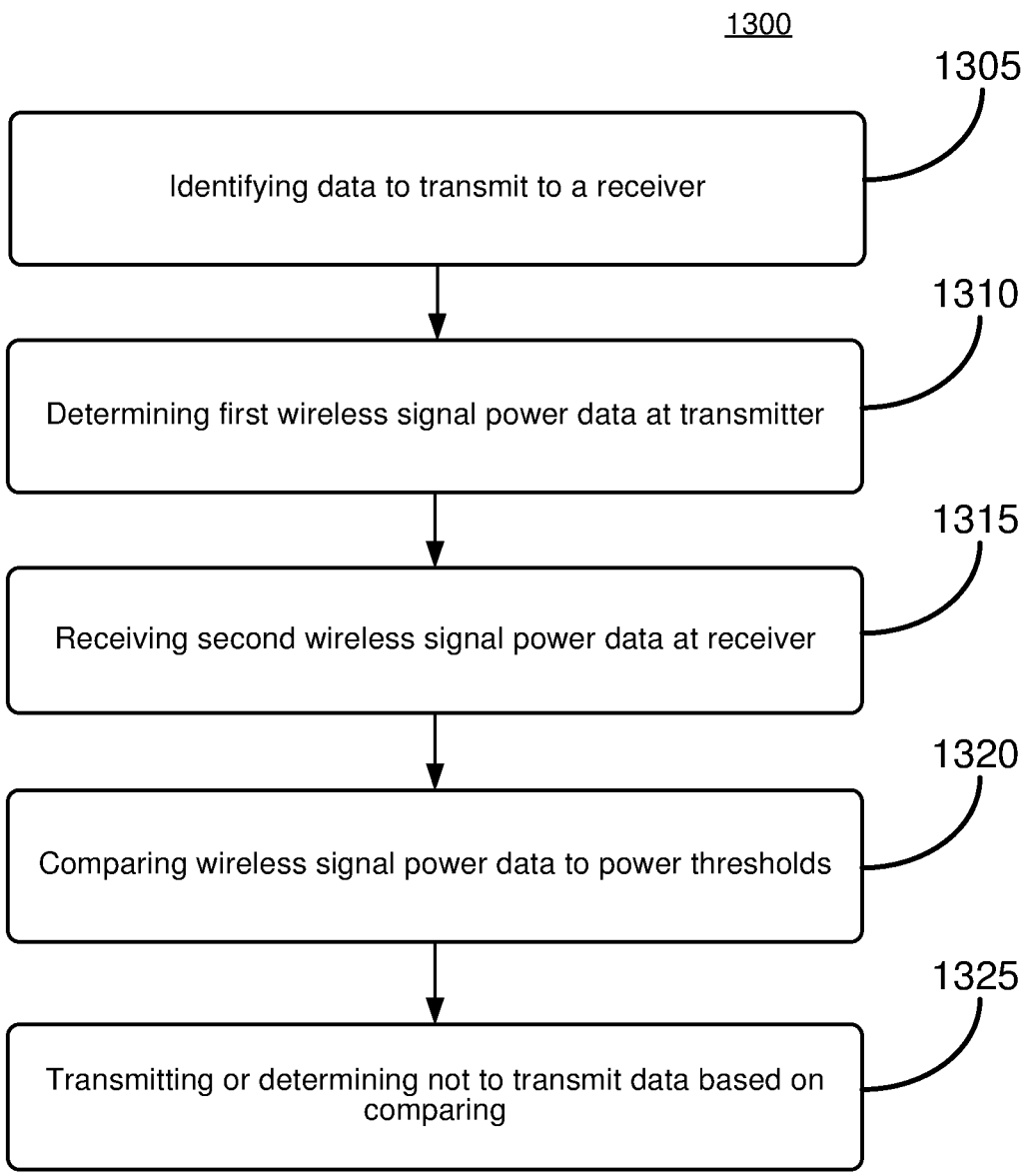

Reference is now made to FIGS. 12-13, which are flowcharts illustrating operations of methods of operating of a device in a wireless network according to some embodiments herein. Referring to FIG. 12, operations include determining (block 1210), by a transmitter of a wireless device in a wireless communication network, first wireless signal power information at the transmitter. In some embodiments, the determining is responsive to the transmitter of the wireless device identifying data to transmit according to a data transmission scheme to a receiver in the wireless communication network.

In some embodiments, the first wireless signal power information at the transmitter is determined based on the data transmission scheme. For example, if the transmission scheme corresponds to a narrow transmission in a given beam direction then the first wireless signal power information may be determined in directions corresponding to the beam direction. In contrast, if the transmission scheme corresponds to a wide transmission in an omni direction, then the first wireless signal power information may be determined in the omni direction. As used here, the omni direction may refer to substantial all directions radiating towards/away from the transmitter and/or receiver.

In some embodiments, second wireless signal power information is received at the transmitter (block 1215). The second wireless signal power information may correspond to conditions at the receiver and may be determined by the receiver. As discussed above regarding the first wireless signal power information, the second wireless signal information may be determined based on the transmission scheme. For example, if the transmission scheme corresponds to a narrow transmission then the second wireless signal power information at the receiver may be determined in one or more directions that correspond to the beam direction. In contrast, if the data transmission scheme corresponds to the wide transmission in the omni direction, then the second wireless signal power information at the receiver may be determined in the omni direction relative to the receiver.

Some embodiments provide that the second wireless signal power information at the receiver is received at the transmitter as periodic data that is received from the receiver at regular time intervals. Some other embodiments provide that the second wireless signal power information at the receiver is received by the transmitter as aperiodic data that is received other than at regular time intervals. Aperiodic data may include any of the second wireless signal power information that is received other than at regular time intervals comprises receiving the second wireless signal power information at scheduled transmission times.

In some embodiments, in which the second wireless signal power information is received as aperiodic data, the second wireless signal power information may be sent to the transmitter based on a request for sensing data. For example, the transmitter may send a sensing request to the receiver to request that the receiver determine the second wireless signal power information and to send the requested information back to the transmitter. Responsive to the request, the transmitter may receive the second wireless signal power information from the receiver.

Some embodiments provide that the second wireless signal power information is received over a licensed channel and/or an unlicensed channel.

Some embodiments may further include comparing the wireless signal power information to power thresholds (block 1220). For example, the first wireless signal power information may be compared to a first power threshold and/or the second wireless signal power information may be compared to a second power threshold. Based on the comparing, operations may include transmitting the data to the receiver or determining not to transmit the data to the receiver (block 1225).

In some embodiments, depending on whether the transmission scheme includes narrow or omni direction transmissions, different power threshold values may be used. Some embodiments provide the power thresholds may be adaptively determined according to transmission options at the transmitter.

For example, the first wireless signal power information may be compared to the first power threshold and if the first wireless signal power information includes a power value that is not less than the first power threshold then the transmitter may determine that the data should not be transferred. In such circumstances, the determination not to transmit the data according to the transmission scheme may be made without analyzing the second wireless signal power information that corresponds to the receiver. In contrast, if the first wireless signal power information includes a power value that is less than the first power threshold then the transmitter may then evaluate the second wireless signal power information. In some embodiments, the second wireless signal power information is generated and sent periodically and thus may be immediately available to the transmitter.

Some embodiments provide that the second wireless signal power information is aperiodic and thus either determined and sent at scheduled times and/or generated and sent in response to a sensing request received from the transmitter. The second wireless signal power information may be compared to the second power threshold and if the second wireless signal power information includes a power value that is not less than the second power threshold then the transmitter may determine that the data should not be transferred. In contrast, if the second wireless signal power information includes a power value that is less than the second power threshold, then the data may be transmitted to the receiver according to the transmission scheme.

While the present embodiments are discussed in the context of a single receiver that is to receive data transmitted from the transmitter, the present disclosure is not so limited. For example, some embodiments provide that the transmitter may be configured to transmit the data to more than one receiver. In such embodiments, the transmitter may send a sensing request to all of the receivers that are scheduled according to the transmission scheme. Each of the multiple receivers may sense the channels to generate second wireless signal power information corresponding to their conditions. Upon receipt of the second wireless signal power information from all of the multiple receivers, the transmitter may determine which, if any, of the receivers to transmit the data to based on individual comparisons to the second power threshold(s).

Brief reference is now made to FIG. 13, which includes operations corresponding to blocks 1310, 1315, 1320, and 1325 which correspond to blocks 1210, 1215, 1220 and 1225 discussed above regarding FIG. 12. As such, redundant discussion of these operations will not be provided. Operations of FIG. 13 include identifying data to transmit to a receiver (block 1305). Some embodiments provide that identifying the data includes identifying the transmission scheme for transmitting the data. In some embodiments, identifying the data for transmitting includes receiving the data for transmission from another network source and/or element.

Figure 14:
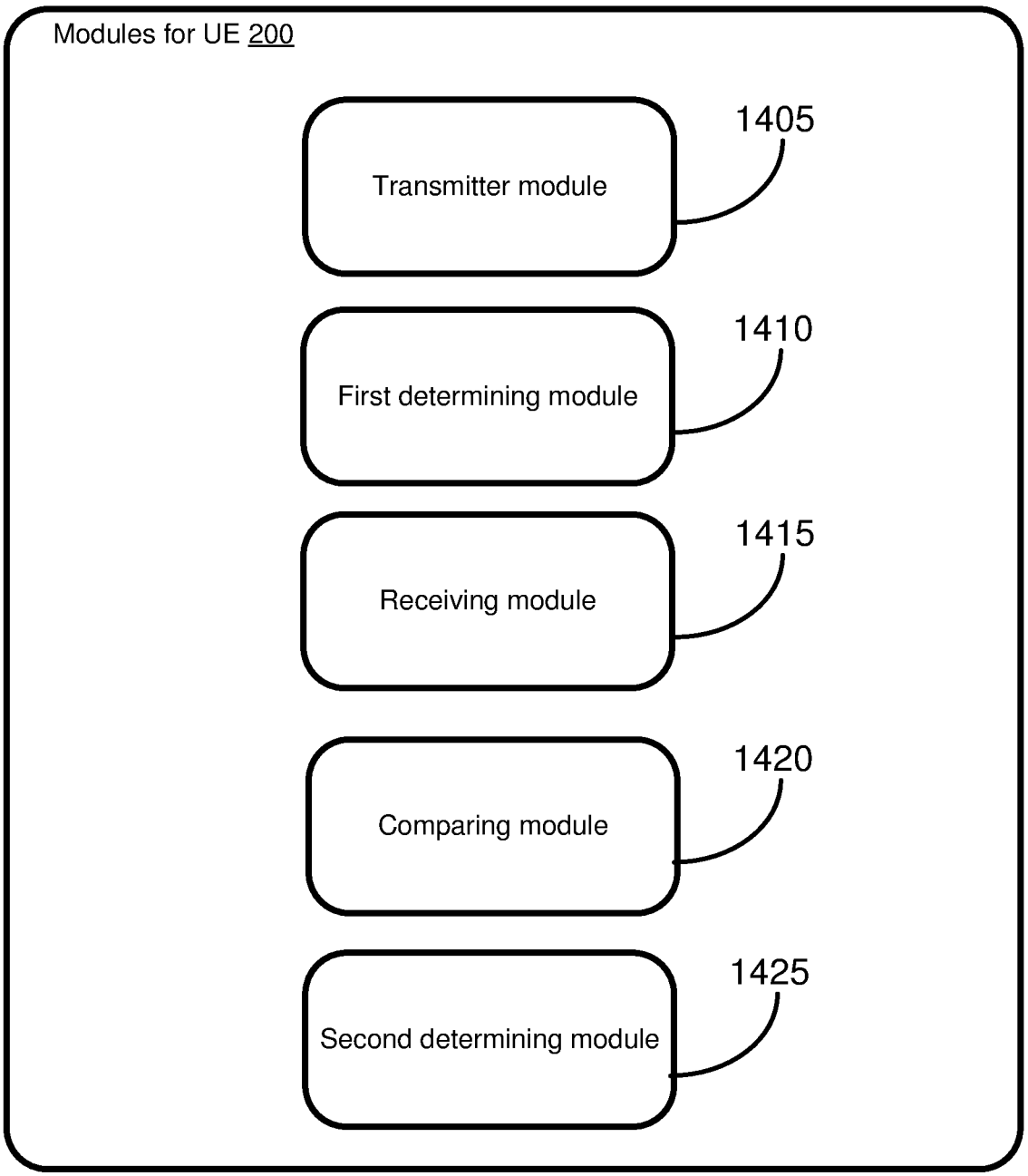
FIG. 14 illustrates modules for a UE that perform operations as disclosed herein according to some embodiments.

FIG. 14 illustrates modules for a UE 200 that perform operations as disclosed herein according to some embodiments. Some embodiments include a transmitter module 1405 that identifies data to transmit according to a data transmission scheme to a receiver in a wireless communication network. A first determining module 1410 may be is configured to determine first wireless signal power information at the transmitter module in the wireless communication network. A receiving module 1415 may be configured to receive a second wireless signal power information at the receiver. A comparing module 1420 may be configured to compare the first wireless signal power information to a first power threshold and/or the second wireless signal power information to a second power threshold. A second determining module 1425 may be configured to determine whether to transmit identified data to the receiver based on comparing the first wireless signal power information to the first power threshold and/or the second wireless signal power information to the second power threshold. Some embodiments provide that the transmitter module is configured to transmit the identified data to the receiver responsive to the second determining module determining to transmit the identified data to the receiver.

Figure 15:
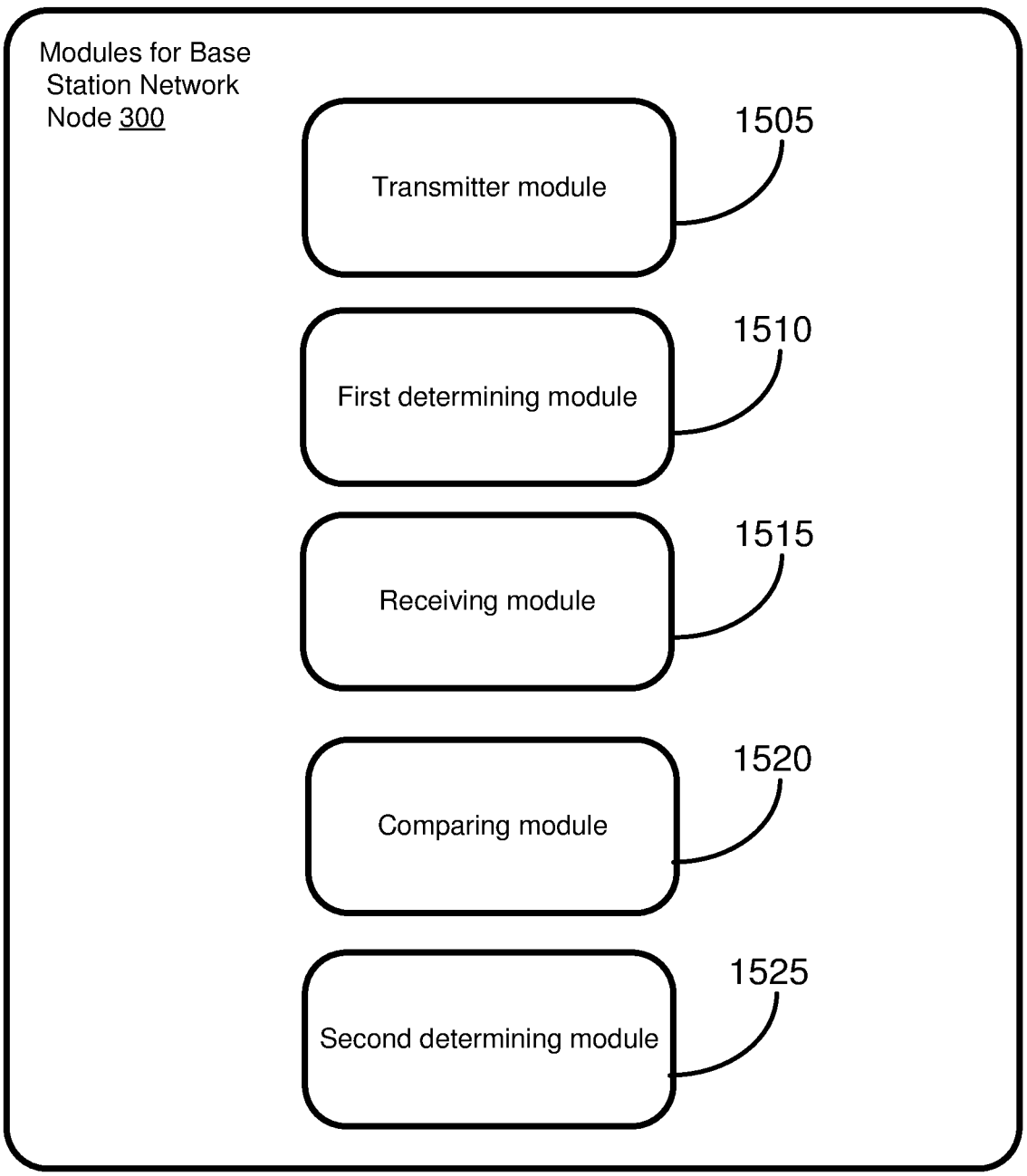
FIG. 15 illustrates modules for a base station network node that perform operations as disclosed herein according to some embodiments.

FIG. 15 illustrates modules for a base station network node 300 that perform operations as disclosed herein according to some embodiments. Some embodiments include a transmitter module 1505 that identifies data to transmit according to a data transmission scheme to a receiver in a wireless communication network. A first determining module 1510 may be is configured to determine first wireless signal power information at the transmitter module in the wireless communication network. A receiving module 1515 may be configured to receive a second wireless signal power information at the receiver. A comparing module 1520 may be configured to compare the first wireless signal power information to a first power threshold and/or the second wireless signal power information to a second power threshold. A second determining module 1525 may be configured to determine whether to transmit identified data to the receiver based on comparing the first wireless signal power information to the first power threshold and/or the second wireless signal power information to the second power threshold. Some embodiments provide that the transmitter module is configured to transmit the identified data to the receiver responsive to the second determining module determining to transmit the identified data to the receiver.

Figure 16:
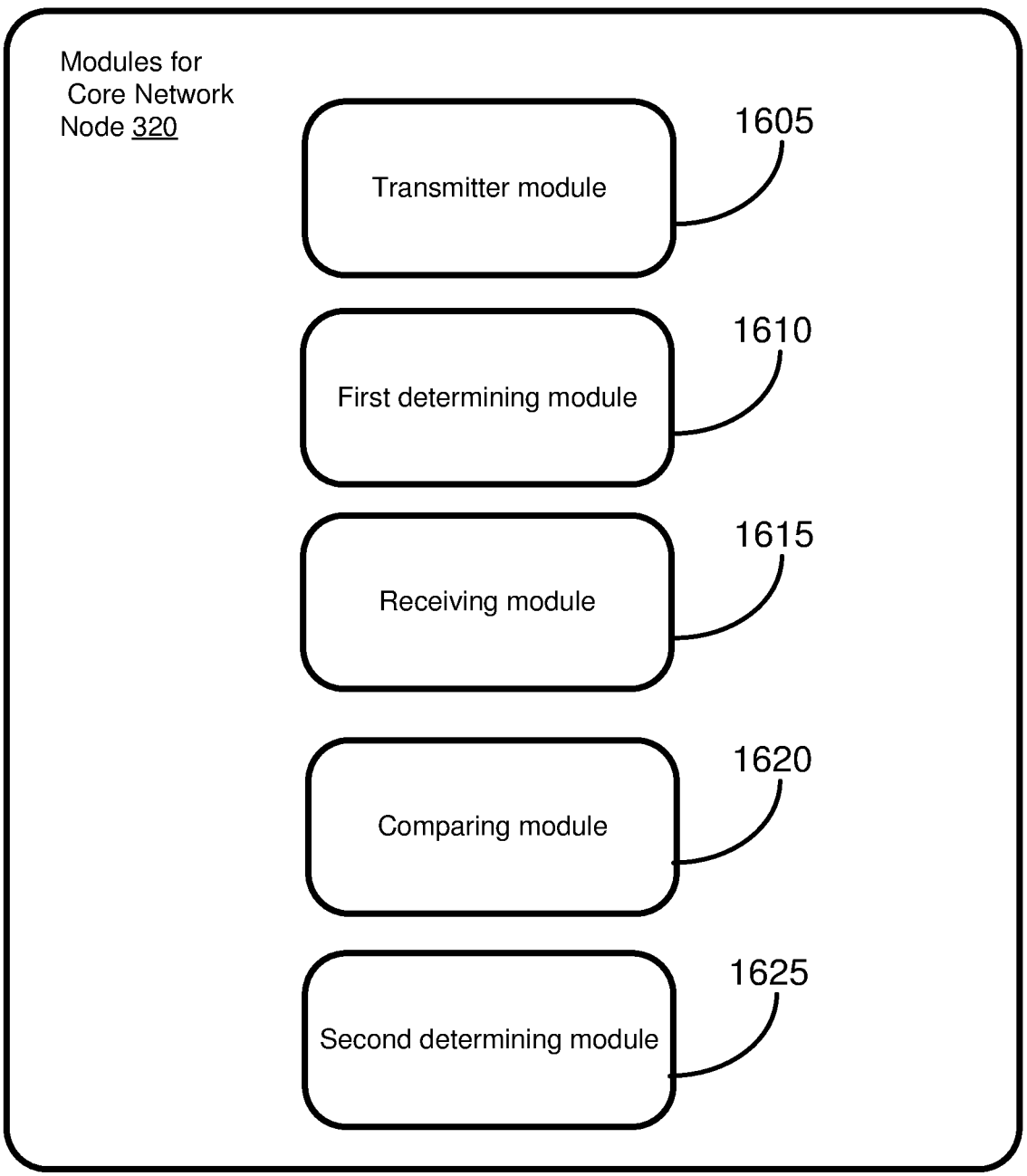
FIG. 16 illustrates modules for a core network node that perform operations as disclosed herein according to some embodiments.

FIG. 16 illustrates modules for a core network node 320 that perform operations as disclosed herein according to some embodiments. Some embodiments include a transmitter module 1605 that identifies data to transmit according to a data transmission scheme to a receiver in a wireless communication network. A first determining module 1610 may be is configured to determine first wireless signal power information at the transmitter module in the wireless communication network. A receiving module 1615 may be configured to receive a second wireless signal power information at the receiver. A comparing module 1620 may be configured to compare the first wireless signal power information to a first power threshold and/or the second wireless signal power information to a second power threshold. A second determining module 1625 may be configured to determine whether to transmit identified data to the receiver based on comparing the first wireless signal power information to the first power threshold and/or the second wireless signal power information to the second power threshold. Some embodiments provide that the transmitter module is configured to transmit the identified data to the receiver responsive to the second determining module determining to transmit the identified data to the receiver.

In some embodiments, a computer program comprises instructions which, when executed by at least one processor, causes at least one processor to carry out the functionality of a radio access node or another node implementing one or more of the functions of the radio access node in a virtual environment according to any of the embodiments described herein.

While the disclosed subject matter has been presented above with reference to various embodiments, it will be understood that various changes in form and details may be made to the described embodiments without departing from the overall scope of the disclosed subject matter.

LIST OF ABBREVIATIONS

MBMS Multimedia Broadcast Multicast Service
MCE Multi-cell/multicast Coordination Entity
Tx Transmitter
UE User Equipment
BS Base Station
BLER Block Error Ratio
DL Downlink
DPD Digital Predistortion
eNB Evolved Node B, base station
E-UTRAN Evolved universal terrestrial radio access network
E-UTRA Evolved universal terrestrial radio access
E-UTRA FDD E-UTRA frequency division duplex
E-UTRA TDD E-UTRA time division duplex
IM Inter modulation
LBT Listen Before Talk
LLA Licensed-Assisted Access
LTE Long Term Evolution
MCOT Maximal Channel Occupancy Time
RAT Radio Access Technology
SINR Signal-to-Interference plus Noise Ratio
SNR Signal-to-Noise Ratio
TPC Transmission Power Control
TDD Time division duplex
TxOP Transmission Opportunity
WLAN Wireless Local Area Network
UL Uplink In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random-access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BluRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method by a wireless communication apparatus operating in a wireless communication network, the method comprising:
   performing channel sensing with respect to a frequency channel targeted for use by the wireless communication apparatus for performing a data transmission to another wireless communication apparatus, results of the channel sensing comprising a local sensing outcome;

receiving information indicating a remote sensing outcome of channel sensing performed by the other wireless communication apparatus with respect to the frequency channel; and determining whether to perform the data transmission in dependence on both the local and remote sensing outcomes;

wherein performing channel sensing comprises:
performing a directional detection of signal energy on the frequency channel, when the data transmission is to be performed as a directional transmission using a narrow transmission beam; and
performing a non-directional detection of signal energy on the frequency channel, when the data transmission is to be performed as a non-directional transmission.

2. The method of claim 1, wherein the wireless communication apparatus is one of a radio network node and a wireless communication device served by the radio network node, and the other wireless communication apparatus is the other one of the radio network node and the wireless communication device.

3. The method of claim 2, wherein the wireless communication apparatus is the radio network node and the other wireless communication apparatus is the wireless communication device.

4. The method of claim 2, wherein the wireless communication apparatus is the wireless communication device and the other wireless communication apparatus is the radio network node.

5. The method of claim 1, wherein the remote sensing outcome reflects a directional detection of signal energy on the frequency channel by the other wireless communication apparatus, when the data transmission is to be performed as a directional transmission, and reflects a non-directional detection of signal energy on the frequency channel by the other wireless communication apparatus, when the data transmission is to be performed as a non-directional transmission.

6. The method of claim 1, wherein receiving the information indicating the remote sensing outcome comprises receiving remote sensing outcomes periodically, based on the other wireless communication apparatus periodically performing channel sensing with respect to the frequency channel, and wherein determining whether to perform the data transmission in dependence on both the local and remote sensing outcomes considers one or more of the remote sensing outcomes periodically received from the other wireless communication apparatus.

7. The method of claim 1, wherein receiving the information indicating the remote sensing outcome comprises receiving the information in response to sending a request to the other wireless communication apparatus.

8. The method of claim 7, further comprising sending the request on a conditional basis, wherein the wireless communication apparatus sends the request only if the local sensing outcome indicates that signal energy detected by the wireless communication apparatus for the frequency channel is below a defined threshold.

9. The method of claim 8, further comprising performing the data transmission on the frequency channel only if the remote sensing outcome indicates that signal energy detected by the other wireless communication apparatus for the frequency channel is below the same or another defined threshold.

10. The method of claim 1, wherein determining whether to perform the data transmission in dependence on both the local and remote sensing outcomes comprises performing the data transmission in response to the local and remote sensing outcomes indicating that signal energies respectively detected for the frequency channel at the wireless communication device and the other wireless communication device are below a defined threshold.

11. A wireless communication apparatus configured for operation in a wireless communication network, the wireless communication apparatus comprising:
a transceiver configured for transmitting data to another wireless communication apparatus operating in the wireless communication network; and
processing circuitry operatively associated with the transceiver and configured to:
perform channel sensing with respect to a frequency channel targeted for use by the wireless communication apparatus for performing a data transmission to the other wireless communication apparatus, results of the channel sensing comprising a local sensing outcome;
receive information indicating a remote sensing outcome of channel sensing performed by the other wireless communication apparatus with respect to the frequency channel; and
determine whether to perform the data transmission in dependence on both the local and remote sensing outcomes;
wherein the processing circuitry is configured to perform the channel sensing as:
a directional detection of signal energy on the frequency channel, when the data transmission is to be performed as a directional transmission, the directional detection corresponding to a direction of transmission; and
a non-directional detection of signal energy on the frequency channel, when the data transmission is to be performed as a non-directional transmission.

12. The wireless communication apparatus of claim 11, wherein the wireless communication apparatus is one of a radio network node and a wireless communication device served by the radio network node, and the other wireless communication apparatus is the other one of the radio network node and the wireless communication device.

13. The wireless communication apparatus of claim 12, wherein the wireless communication apparatus is the radio network node and the other wireless communication apparatus is the wireless communication device.

14. The wireless communication apparatus of claim 12, wherein the wireless communication apparatus is the wireless communication device and the other wireless communication apparatus is the radio network node.

15. The wireless communication apparatus of claim 11, wherein the remote sensing outcome reflects a directional detection of signal energy on the frequency channel by the other wireless communication apparatus, when the data transmission is to be performed as a directional transmission, and reflects a non-directional detection of signal energy on the frequency channel by the other wireless communication apparatus, when the data transmission is to be performed as a non-directional transmission.

16. The wireless communication apparatus of claim 11, wherein the processing circuitry is configured to receive remote sensing outcomes periodically, based on the other wireless communication apparatus periodically performing channel sensing with respect to the frequency channel, and wherein the processing circuitry is configured to determine whether to perform the data transmission in dependence on both the local and remote sensing outcomes by considering one or more of the remote sensing outcomes periodically received from the other wireless communication apparatus.

17. The wireless communication apparatus of claim 11, wherein the processing circuitry is configured to receive the information indicating the remote sensing outcome in response to sending a request to the other wireless communication apparatus.

18. The wireless communication apparatus of claim 17, wherein the processing circuitry is configured to send the request on a conditional basis, by sending the request only if the local sensing outcome indicates that signal energy detected by the wireless communication device for the frequency channel is below a defined threshold.

19. The wireless communication apparatus of claim 18, wherein the processing circuitry performs the data transmission on the frequency channel only if the remote sensing outcome indicates that signal energy detected by the other wireless communication apparatus for the frequency channel is below the same or another defined threshold.

20. The wireless communication apparatus of claim 11, wherein the processing circuitry is configured to perform the data transmission in response to the local and remote sensing outcomes indicating that signal energies respectively detected for the frequency channel at the wireless communication apparatus and the other wireless communication apparatus are below a defined threshold.

* * * * *